US010757588B2

(12) United States Patent
Wu et al.

(10) Patent No.: US 10,757,588 B2
(45) Date of Patent: Aug. 25, 2020

(54) METHOD AND DEVICE IN BASE STATION USED FOR WIRELESS COMMUNICATION

(71) Applicant: SHANGHAI LANGBO COMMUNICATION TECHNOLOGY COMPANY LIMITED, Shanghai (CN)

(72) Inventors: KeYing Wu, Shanghai (CN); XiaoBo Zhang, Shanghai (CN); Lin Yang, Shanghai (CN)

(73) Assignee: SHANGHAI LANGBO COMMUNCATION TECHNOLOGY COMPANY LIMITED, Shanghai (CN)

(*) Notice: Subject to any disclaimer, the term of this patent is extended or adjusted under 35 U.S.C. 154(b) by 0 days.

(21) Appl. No.: 16/583,292

(22) Filed: Sep. 26, 2019

(65) Prior Publication Data
US 2020/0107203 A1 Apr. 2, 2020

(30) Foreign Application Priority Data

Sep. 28, 2018 (CN) .......................... 2018 1 1139214

(51) Int. Cl.
H04W 24/02 (2009.01)
H04W 16/18 (2009.01)
H04W 72/04 (2009.01)
H04W 24/08 (2009.01)
H04W 74/08 (2009.01)
H04W 16/14 (2009.01)

(52) U.S. Cl.
CPC ........... *H04W 24/02* (2013.01); *H04W 16/14* (2013.01); *H04W 74/0808* (2013.01)

(58) Field of Classification Search
CPC ............. H04W 56/0015; H04W 56/00; H04W 52/242; H04W 76/27; H04W 24/02; H04W 74/0808; H04W 16/18; H04W 72/04; H04W 72/0446; H04W 72/085; H04W 72/1242; H04W 74/042; H04W 74/044; H04W 24/08; H04W 72/0406
USPC .................. 455/434, 507, 509; 370/328, 352
See application file for complete search history.

(56) References Cited

U.S. PATENT DOCUMENTS 8,996,049 B2 * 3/2015 Nishio ................. H04B 7/0615
455/507
9,473,282 B2 * 10/2016 Nishio .................. H04L 1/1812
(Continued)

*Primary Examiner* — William D Cumming
(74) *Attorney, Agent, or Firm* — Maschoff Brennan

(57) ABSTRACT

The present disclosure provides a method and a device in a base station used for wireless communication. The base station transmits M1 first-type reference signals; receives M2 second-type radio signals in first time-domain resources, with any of the M2 second-type radio signals being associated with one of the M1 first-type reference signals; and transmits a first radio signal in the first time-domain resources. If an antenna port transmitting the first radio signal is associated with at least one of the M2 second-type radio signals, first-type channel monitoring is adopted targeting transmission of the first radio signal; otherwise, second-type channel monitoring is adopted targeting transmission of the first radio signal. The above method allows the base station to share a COT acquired by a UE in unlicensed spectrums so as to increase channel access efficiency, and at the same time avoids interference with other potential ongoing communications.

20 Claims, 17 Drawing Sheets

(56) References Cited

U.S. PATENT DOCUMENTS

| | | | | |
|---|---|---|---|---|
| 10,462,767 B2* | 10/2019 | Zhang | | H04L 1/1812 |
| 10,485,009 B2* | 11/2019 | Zhang | | H04L 1/0072 |
| 2011/0275396 A1* | 11/2011 | Nishio | | H04L 5/0023 |
| | | | | 455/509 |
| 2013/0252606 A1* | 9/2013 | Nimbalker | | H04B 17/309 |
| | | | | 455/434 |
| 2015/0131472 A1* | 5/2015 | Nishio | | H04L 5/0028 |
| | | | | 370/252 |
| 2016/0142994 A1* | 5/2016 | Luo | | H04W 56/0015 |
| | | | | 370/328 |
| 2018/0310276 A1* | 10/2018 | Zhang | | H04L 1/1812 |
| 2018/0324798 A1* | 11/2018 | Zhang | | H04W 24/02 |
| 2019/0014587 A1* | 1/2019 | Zhang | | H04L 1/0046 |
| 2019/0261346 A1* | 8/2019 | Jiang | | H04W 56/00 |
| 2019/0289637 A1* | 9/2019 | Jiang | | H04L 1/1887 |
| 2019/0306727 A1* | 10/2019 | Jiang | | H04W 16/18 |
| 2019/0306743 A1* | 10/2019 | Wu | | H04W 74/0808 |
| 2019/0326969 A1* | 10/2019 | Jiang | | H04L 5/0005 |
| 2019/0335385 A1* | 10/2019 | Zhang | | H04L 5/0046 |
| 2019/0380110 A1* | 12/2019 | Zhang | | H04W 72/04 |
| 2019/0387537 A1* | 12/2019 | Zhang | | H04L 1/0026 |
| 2020/0022107 A1* | 1/2020 | Zhang | | H04L 25/00 |
| 2020/0037268 A1* | 1/2020 | Zhang | | H04W 52/242 |
| 2020/0044801 A1* | 2/2020 | Wang | | H04W 76/27 |
| 2020/0052744 A1* | 2/2020 | Zhang | | H04B 7/086 |
| 2020/0107203 A1* | 4/2020 | Wu | | H04W 24/02 |
| 2020/0119872 A1* | 4/2020 | Wu | | H04L 5/0046 |
| 2020/0120684 A1* | 4/2020 | Wu | | H04W 24/08 |
| 2020/0120686 A1* | 4/2020 | Zhang | | H04L 1/0072 |
| 2020/0120696 A1* | 4/2020 | Wu | | H04L 5/0037 |
| 2020/0127788 A1* | 4/2020 | Wu | | H04W 72/044 |
| 2020/0137606 A1* | 4/2020 | Jiang | | H04W 72/042 |
| 2020/0145132 A1* | 5/2020 | Jiang | | H04L 5/00 |
| 2020/0145976 A1* | 5/2020 | Jiang | | H04W 72/085 |
| 2020/0154458 A1* | 5/2020 | Zhang | | H04W 72/1242 |
| 2020/0163096 A1* | 5/2020 | Wu | | H04W 72/04 |
| 2020/0169907 A1* | 5/2020 | Zhang | | H04W 72/0406 |
| 2020/0169988 A1* | 5/2020 | Wu | | H04W 72/04 |
| 2020/0178151 A1* | 6/2020 | Zhang | | H04W 72/0446 |

* cited by examiner

Given first-type reference signal ⇒ First component

First reference power ∝ First component

A transmission power of given second-type radio signal = min( First reference power, First power threshold )

METHOD AND DEVICE IN BASE STATION USED FOR WIRELESS COMMUNICATION

CROSS-REFERENCE TO RELATED APPLICATION

This application claims the priority benefit of Chinese Patent Application Serial Number 201811139214.1, filed on Sep. 28, 2018, the full disclosure of which is incorporated herein by reference.

BACKGROUND

Technical Field

The present disclosure relates to transmission methods and devices of radio signals in wireless communication systems, and in particular to a transmission method and device for radio signals in a wireless communication system supporting data transmission in unlicensed spectrums.

Related Art

In traditional 3GPP (3rd Generation Partner Project) LTE (Long-term Evolution) systems, data transmission only occurs in licensed spectrums. With the rapid growth of the traffic and diversification of application scenarios, traditional licensed spectrums won't be sufficient to fulfill the service demands. Therefore, in LTE Release 13 and Release 14, communication in unlicensed spectrums is introduced to cellular network and used for data transmission in both downlink and uplink.

In the LTE LAA (License Assisted Access) project, a transmitter (a base station or a user equipment) needs to perform Listen Before Talk (LBT) before transmitting data in an unlicensed spectrum so as to avoid interfering other ongoing radio transmissions in the unlicensed spectrum. To avoid the decrease of spectrum efficiency and increase of delay due to frequent LBT, Release 15 introduced Autonomous UpLink (AUL) access in unlicensed spectrums. In AUL, a User Equipment (UE) can automatically transmit in radio resources previously allocated by a base station without grant. The channel occupancy time (COT) acquired by a UE through LBT in AUL can also be shared by the base station to increase the channel occupancy efficiency.

SUMMARY

The inventor finds through researches that the transmission from a UE can only occupy the channel around the UE, but cannot ensure that the channel over the entire coverage of the base station is occupied. Therefore, when a base station shares the COT acquired by a UE through LBT its transmission should be restricted so as not to interfere with other potential ongoing communications within its coverage.

In view of the above problem, the present disclosure provides a solution. The embodiments of the present disclosure and the characteristics in the embodiments may be arbitrarily combined if no conflict is caused.

The present disclosure provides a method in a base station for wireless communication. The method includes the following steps of:

transmitting M1 first-type reference signals, with the M1 being a positive integer;

receiving M2 second-type radio signals in first time-domain resources, with any of the M2 second-type radio signals being associated with one of the M1 first-type reference signals, and with the M2 being a positive integer; and transmitting a first radio signal in the first time-domain resources.

Herein if an antenna port transmitting the first radio signal is associated with at least one of the M2 second-type radio signals, first-type channel monitoring is adopted targeting transmission of the first radio signal; otherwise, second-type channel monitoring is adopted targeting transmission of the first radio signal.

In an embodiment, the above method aims to solve a problem of avoiding interfering with other ongoing communications within the base station's coverage when the base station shares a COT acquired by a UE through LBT in unlicensed spectrums. In the above method, the base station transmits over the shared COT without LBT or with only a one-shot LBT only if the transmission is spatially associated with the reception from the UE; otherwise, an additional LBT is needed at the base station. By doing so, this problem is solved.

In an embodiment, the above method is characterized in that: the first time-domain resources are a COT acquired by a transmitter/transmitters of the M2 second-type radio signals, the first-type channel monitoring is no-LBT or a one-shot LBT, and the second-type channel monitoring is a full LBT with random backoff. If the first radio signal is spatially associated with at least one of the M2 second-type radio signals, no-LBT is required or only a one-shot LBT is performed by the base station before transmitting the first radio signal to increase a channel access efficiency; otherwise, a full LBT needs to be performed to avoid interference with other ongoing communications and maintain a fair competition about channel occupancy.

In an embodiment, the above method is advantageous in allowing the base station to share a COT acquired by a UE to increase channel access efficiency, and at the same time avoiding interference with other potential ongoing communications within the coverage of the base station and maintaining a fair competition about channel occupancy.

According to one aspect of the present disclosure, the method further includes the following step of:

performing the first-type channel monitoring.

Herein the antenna port transmitting the first radio signal is associated with at least one of the M2 second-type radio signals.

According to one aspect of the present disclosure, the method further includes the following step of:

performing the second-type channel monitoring.

Herein the antenna port transmitting the first radio signal is not associated with any of the M2 second-type radio signals.

According to one aspect of the present disclosure, the method is characterized in that: a probability of transmitting the first radio signal in the first time-domain resources when the first-type channel monitoring is adopted is larger than a probability of transmitting the first radio signal in the first time-domain resources when the second-type channel monitoring is adopted.

According to one aspect of the present disclosure, the method is characterized in that: a transmission power of one of the M2 second-type radio signals is related to one of the M1 first-type reference signals.

According to one aspect of the present disclosure, the method is characterized in that: a spatial domain transmission filter used for a transmission of one of the M2 second-type radio signals is related to one of the M1 first-type reference signals.

According to one aspect of the present disclosure, the method further includes the following step of:

transmitting first information.

Herein the first information is used for determining Q time windows, with time-domain resources occupied by the M2 second-type radio signals belonging to the Q time windows; and the Q is a positive integer.

According to one aspect of the present disclosure, the method further includes the following step of:

transmitting a first signaling.

Herein the first signaling indicates frequency-domain resources occupied by the M2 second-type radio signals.

According to one aspect of the present disclosure, the method further includes the following steps of:

transmitting N1 first-type reference signals; and receiving first uplink information.

Herein measurements targeting the N1 first-type reference signals are used for generating the first uplink information; and the first uplink information is used for determining the M1 first-type reference signals; and the N1 is a positive integer.

According to one aspect of the present disclosure, the method further includes the following step of:

transmitting N2 first-type reference signals; and receiving second uplink information.

Herein measurements targeting the N2 first-type reference signals are used for generating the second uplink information; and the second uplink information is used for determining a first reference signal, with the antenna port transmitting the first radio signal being associated with the first reference signal; and the N2 is a positive integer.

The present disclosure provides a base station for wireless communication. The base station includes:

a first transmitter, to transmit M1 first-type reference signals, with the M1 being a positive integer;

a first receiver, to receive M2 second-type radio signals in first time-domain resources, with any of the M2 second-type radio signals being associated with one of the M1 first-type reference signals, and with the M2 being a positive integer; and a second transmitter, to transmit a first radio signal in the first time-domain resources.

Herein if an antenna port transmitting the first radio signal is associated with at least one of the M2 second-type radio signals, first-type channel monitoring is adopted targeting transmission of the first radio signal; otherwise, second-type channel monitoring is adopted targeting transmission of the first radio signal.

In an embodiment, compared with the prior art, the present disclosure has the following technical benefits:

In unlicensed spectrums, the base station is allowed to share a COT acquired by a UE to increase channel access efficiency, and at the same time interference with other potential ongoing communications within the coverage of the base station is prevented and a fair competition about channel occupancy is guaranteed.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

Embodiment 1

Figure 1:
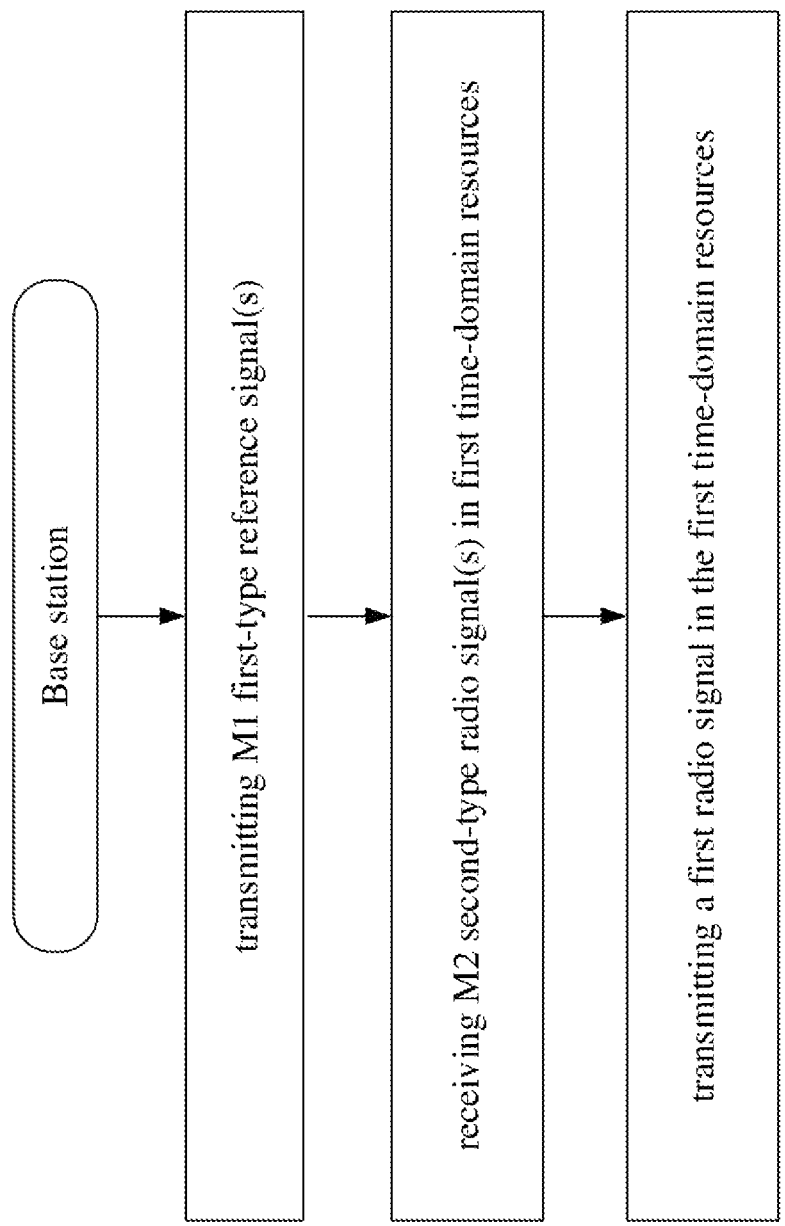
FIG. 1 is a flowchart of M1 first-type reference signals, M2 second-type radio signals and a first radio signal according to one embodiment of the present disclosure.

Embodiment 1 illustrates an example of a flowchart of M1 first-type reference signals, M2 second-type radio signals and a first radio signal, as shown in FIG. 1.

In Embodiment 1, the base station in the present disclosure transmits M1 first-type reference signals, with the M1 being a positive integer; receives M2 second-type radio signals in first time-domain resources, with any of the M2 second-type radio signals being associated with one of the M1 first-type reference signals, and with the M2 being a positive integer; and transmits a first radio signal in the first time-domain resources. If an antenna port transmitting the first radio signal is associated with at least one of the M2 second-type radio signals, first-type channel monitoring is adopted targeting transmission of the first radio signal; otherwise, second-type channel monitoring is adopted targeting transmission of the first radio signal.

In an embodiment, if the antenna port transmitting the first radio signal is associated with at least one of the M2 second-type radio signals, the first-type channel monitoring is adopted targeting transmission of the first radio signal; if the antenna port transmitting the first radio signal is not associated with any of the M2 second-type radio signals, the second-type channel monitoring is adopted targeting transmission of the first radio signal.

In an embodiment, the M2 second-type radio signals contain uplink data.

In an embodiment, the M2 second-type radio signals are transmitted using uplink transmission with configured grant.

In an embodiment, the M2 second-type radio signals are transmitted using type 1 uplink transmission with configured grant.

In an embodiment, the M2 second-type radio signals are transmitted using type 2 uplink transmission with configured grant.

In an embodiment, refer to 3GPP TS38.214 and 3GPP TS38.321 for a detailed definition of uplink transmission with configured grant.

In an embodiment, refer to 3GPP TS38.214 and 3GPP TS38.321 for a detailed definition of type 1 uplink transmission with configured grant.

In an embodiment, refer to 3GPP TS38.214 and 3GPP TS38.321 for a detailed definition of type 2 uplink transmission with configured grant.

In an embodiment, the M2 second-type radio signals contain Autonomous UpLink-Uplink control information (AUL-UCI).

In an embodiment, each of the M2 second-type radio signals contains AUL-UCI.

In an embodiment, at least one of the M2 second-type radio signals contains AUL-UCI.

In an embodiment, for any given second-type radio signal of the M2 second-type radio signals, a transmitter of the given second-type radio signal determines to transmit the given second-type radio signal by itself.

In an embodiment, time and frequency-domain resources occupied by any of the M2 second-type radio signals belong to AUL resources.

In an embodiment, time and frequency-domain resources occupied by any of the M2 second-type radio signals belong to resources allocated for uplink transmission with configured grant.

In an embodiment, at least two of the M2 second-type radio signals are associated with a same first-type reference signal of the M1 first-type reference signals.

In an embodiment, any two of the M2 second-type radio signals are associated with different first-type reference signals of the M1 first-type reference signals.

In an embodiment, any of the M2 second-type radio signals is associated with one and only one of the M1 first-type reference signals.

In an embodiment, the M1 equals to 1.

In an embodiment, the M1 is larger than 1.

In an embodiment, the M2 equals to 1.

In an embodiment, the M2 is larger than 1.

In an embodiment, the M2 is equal to the M1.

In an embodiment, the M2 is smaller than the M1.

In an embodiment, the M2 is larger than the M1.

In an embodiment, the M1 first-type reference signals are transmitted in a same carrier.

In an embodiment, the M1 first-type reference signals are transmitted in a same BWP (Bandwidth Part).

In an embodiment, at least two of the M1 first-type reference signals are transmitted in different carriers.

In an embodiment, at least two of the M1 first-type reference signals are transmitted in different BWPs.

In an embodiment, the M1 first-type reference signals are transmitted on a frequency band deployed in an unlicensed spectrum.

In an embodiment, the M1 first-type reference signals are transmitted on a frequency band deployed in a licensed spectrum.

In an embodiment, the M2 second-type radio signals are transmitted in a same carrier.

In an embodiment, the M2 second-type radio signals are transmitted in a same BWP.

In an embodiment, at least two of the M2 second-type radio signals are transmitted in different carriers.

In an embodiment, at least two of the M2 second-type radio signals are transmitted in different BWPs.

In an embodiment, at least two of the M2 second-type radio signals are transmitted in a same carrier.

In an embodiment, at least two of the M2 second-type radio signals are transmitted in a same BWP.

In an embodiment, the M2 second-type radio signals are transmitted on a frequency band deployed in an unlicensed spectrum.

In an embodiment, the first radio signal is transmitted on a frequency band deployed in an unlicensed spectrum.

In an embodiment, the M1 first-type reference signals and the M2 second-type radio signals are transmitted in a same carrier.

In an embodiment, the M1 first-type reference signals and the M2 second-type radio signals are transmitted in a same BWP.

In an embodiment, at least one of the M1 first-type reference signals and at least one of the M2 second-type radio signals are transmitted in different carriers.

In an embodiment, at least one of the M1 first-type reference signals and at least one of the M2 second-type radio signals are transmitted in different BWPs.

In an embodiment, at least one of the M1 first-type reference signals and at least one of the M2 second-type radio signals are transmitted in a same carrier.

In an embodiment, at least one of the M1 first-type reference signals and at least one of the M2 second-type radio signals are transmitted in a same BWP.

In an embodiment, the M1 first-type reference signals and the M2 second-type radio signals are transmitted in different carriers.

In an embodiment, the M1 first-type reference signals and the M2 second-type radio signals are transmitted in different BWPs.

In an embodiment, the M2 second-type radio signals and the first radio signal are transmitted in a same carrier.

In an embodiment, the M2 second-type radio signals and the first radio signal are transmitted in a same BWP.

In an embodiment, the M2 second-type radio signals and the first radio signal are transmitted in different carriers.

In an embodiment, the M2 second-type radio signals and the first radio signal are transmitted in different BWPs.

In an embodiment, at least one of the M2 second-type radio signals and the first radio signal are transmitted in different carriers.

In an embodiment, at least one of the M2 second-type radio signals and the first radio signal are transmitted in different BWPs.

In an embodiment, at least one of the M2 second-type radio signals and the first radio signal are transmitted in a same carrier.

In an embodiment, at least one of the M2 second-type radio signals and the first radio signal are transmitted in a same BWP.

In an embodiment, the first radio signal contains downlink data.

In an embodiment, the first radio signal contains a physical-layer signaling.

In an embodiment, the first radio signal contains a dynamic signaling.

In an embodiment, the first radio signal contains a L1 layer signaling.

In an embodiment, the first radio signal contains a L1 layer control signaling.

In an embodiment, the first radio signal contains a L1 layer downlink control signaling.

In an embodiment, the first radio signal contains DCI (Downlink Control Information).

In an embodiment, the first radio signal contains downlink grant DCI.

In an embodiment, the first radio signal contains uplink grant DCI.

In an embodiment, the first radio signal contains DCI with Cyclic Redundancy Check (CRC) scrambled by Cell (C)-Radio Network Temporary Identifier (RNTI).

In an embodiment, the first radio signal contains DCI with CRC scrambled by CS (Configured Scheduling)-RNTI.

In an embodiment, the first radio signal contains DCI with CRC scrambled by new-RNTI.

In an embodiment, the first radio signal contains DCI with CRC scrambled by CC (Component Carrier)-RNTI.

In an embodiment, the first radio signal is UE-specific.

In an embodiment, the first radio signal is cell common.

In an embodiment, the first radio signal is terminal-group specific, where the terminal-group contains multiple terminals.

In an embodiment, the first radio signal contains DeModulation Reference Signals (DMRS).

In an embodiment, the first-type channel monitoring refers to no-LBT, and the phrase that first-type channel monitoring is adopted targeting transmission of the first radio signal includes: the base station does not perform LBT between an end of time-domain resources occupied by the M2 second-type radio signals and a start of time-domain resources occupied by the first radio signal; the second-type channel monitoring refers to LBT, and the phrase that second-type channel monitoring is adopted targeting transmission of the first radio signal includes: the base station performs LBT between the end of the time-domain resources occupied by the M2 second-type radio signals and the start of the time-domain resources occupied by the first radio signal to determine whether to transmit the first radio signal or not.

In an embodiment, the first-type channel monitoring refers to no-LBT, and the phrase that first-type channel monitoring is adopted targeting transmission of the first radio signal includes: a transmission of the first radio signal is subject to no-LBT; the second-type channel monitoring refers to LBT, and the phrase that second-type channel monitoring is adopted targeting transmission of the first radio signal includes: the base station performs LBT to determine whether to transmit the first radio signal or not.

In an embodiment, the first-type channel monitoring refers to no-LBT, and the phrase that first-type channel monitoring is adopted targeting transmission of the first radio signal includes: the base station does not perform LBT between an end of time-domain resources occupied by the M2 second-type radio signals and a start of time-domain resources occupied by the first radio signal; the second-type channel monitoring refers to a downlink channel access procedure, and the phrase that second-type channel monitoring is adopted targeting transmission of the first radio signal includes: the base station performs the downlink channel access procedure between the end of the time-domain resources occupied by the M2 second-type radio signals and the start of the time-domain resources occupied by the first radio signal to determine whether to transmit the first radio signal or not.

In an embodiment, refer to 15.1 of 3GPP TS36.213 for a detailed description of the downlink channel access procedure.

In an embodiment, the first-type channel monitoring refers to Category 2 LBT, and the phrase that first-type channel monitoring is adopted targeting transmission of the first radio signal includes: the base station performs Category 2 LBT between an end of time-domain resources occupied by the M2 second-type radio signals and a start of time-domain resources occupied by the first radio signal to determine whether to transmit the first radio signal or not; the second-type channel monitoring refers to Category 4 LBT, and the phrase that second-type channel monitoring is adopted targeting transmission of the first radio signal includes: the base station performs Category 4 LBT between the end of the time-domain resources occupied by the M2 second-type radio signals and the start of the time-domain resources occupied by the first radio signal to determine whether to transmit the first radio signal or not.

In an embodiment, the first-type channel monitoring refers to one-shot LBT, and the phrase that first-type channel monitoring is adopted targeting transmission of the first radio signal includes: the base station performs one-shot LBT between an end of time-domain resources occupied by the M2 second-type radio signals and a start of time-domain resources occupied by the first radio signal to determine whether to transmit the first radio signal or not; the second-type channel monitoring refers to Category 4 LBT, and the phrase that second-type channel monitoring is adopted targeting transmission of the first radio signal includes: the base station performs Category 4 LBT between the end of the time-domain resources occupied by the M2 second-type radio signals and the start of the time-domain resources occupied by the first radio signal to determine whether to transmit the first radio signal or not.

In an embodiment, refer to 3GPP TR36.889 for a detailed definition of LBT.

In an embodiment, refer to 3GPP TR36.889 for a detailed definition of Category 4 LBT.

In an embodiment, refer to 3GPP TR36.889 for a detailed definition of Category 2 LBT.

In an embodiment, the phrase that any of the M2 second-type radio signals being associated with one of the M1 first-type reference signals includes: for any given second-type radio signal of the M2 second-type radio signals, one of the M1 first-type reference signals is used for determining a transmission power of the given second-type radio signal.

In an embodiment, the phrase that any of the M2 second-type radio signals being associated with one of the M1 first-type reference signals includes: for any given second-type radio signal of the M2 second-type radio signals, one of the M1 first-type reference signals is used for determining a spatial domain transmission filter used for a transmission of the given second-type radio signal.

In an embodiment, the phrase that any of the M2 second-type radio signals being associated with one of the M1 first-type reference signals includes: for any given second-type radio signal of the M2 second-type radio signals, one of the M1 first-type reference signals is used for determining at least one of a transmission power of the given second-type radio signal or a spatial domain transmission filter used for a transmission of the given second-type radio signal.

In an embodiment, the phrase that any of the M2 second-type radio signals being associated with one of the M1 first-type reference signals includes: for any given second-type radio signal of the M2 second-type radio signals, the given second-type radio signal is transmitted with a same spatial domain transmission filter used for a reception of one of the M1 first-type reference signals.

In an embodiment, the phrase that any of the M2 second-type radio signals being associated with one of the M1 first-type reference signals includes: for any given second-type radio signal of the M2 second-type radio signals, a spatial domain receive filter used for a reception of one of the M1 first-type reference signals is used for determining a spatial domain transmission filter used for a transmission of the given second-type radio signal.

In an embodiment, the phrase that any of the M2 second-type radio signals being associated with one of the M1 first-type reference signals includes: for any given second-type radio signal of the M2 second-type radio signals, one of the M1 first-type reference signals is used for determining a precoding matrix of the given second-type radio signal.

In an embodiment, the phrase that any of the M2 second-type radio signals being associated with one of the M1 first-type reference signals includes: for any given second-type radio signal of the M2 second-type radio signals, one of the M1 first-type reference signals is used for determining an antenna port transmitting the given second-type radio signal.

In an embodiment, the phrase that an antenna port transmitting the first radio signal is associated with at least one of the M2 second-type radio signals includes: the first radio signal is transmitted with a same spatial domain transmission filter used for a reception of at least one of the M2 second-type radio signals.

In an embodiment, the phrase that an antenna port transmitting the first radio signal is associated with at least one of the M2 second-type radio signals includes: a spatial domain receive filter used for a reception of at least one of the M2 second-type radio signals is used for determining a spatial domain transmission filter used for a transmission of the first radio signal.

In an embodiment, the phrase that an antenna port transmitting the first radio signal is associated with at least one of the M2 second-type radio signals includes: the antenna port transmitting the first radio signal and an antenna port transmitting a given reference signal are quasi co-located, wherein the given reference signal is one of the M1 first-type reference signals that is associated with at least one of the M2 second-type radio signals.

In an embodiment, the phrase of an antenna port transmitting the first radio signal refers to: any antenna port transmitting the first radio signal, if the first radio signal is transmitted by more than one antenna port.

In an embodiment, the phrase of an antenna port transmitting the first radio signal refers to: at least one antenna port transmitting the first radio signal, if the first radio signal is transmitted by more than one antenna port.

Embodiment 2

Figure 2:
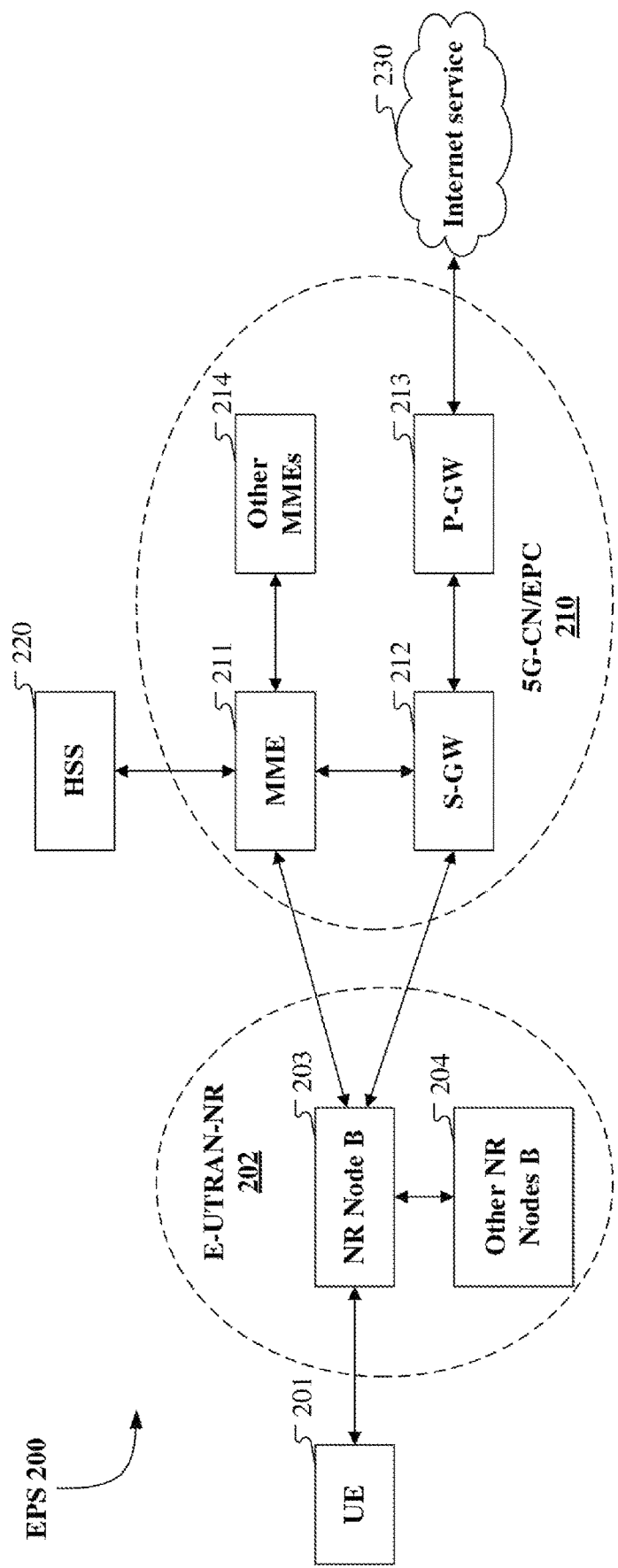
FIG. 2 is a diagram illustrating a network architecture according to one embodiment of the present disclosure.

Embodiment 2 illustrates an example of a diagram of a network architecture, as shown in FIG. 2.

FIG. 2 illustrates a network architecture 200 of Long-Term Evolution (LTE), Long-Term Evolution Advanced (LTE-A) and future 5G systems. The LTE, LTE-A and 5G network architecture 200 may be called an Evolved Packet System (EPS) 200. The EPS 200 may include one or more UEs 201, an Evolved UMTS Terrestrial Radio Access Network-New Radio (E-UTRAN-NR) 202, a 5G-Core Network/Evolved Packet Core (5G-CN/EPC) 210, a Home Subscriber Server (HSS) 220 and an Internet Service 230. Herein, the UMTS represents Universal Mobile Telecommunication System. The EPS may be interconnected with other access networks. For simple description, the entities/interfaces are not shown. As shown in FIG. 2, the EPS provides packet switching services. Those skilled in the art are easy to understand that various concepts presented throughout the present disclosure can be extended to networks providing circuit switching services. The E-UTRAN-NR includes an NR node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Basic Service Set (BSS), an Extended Service Set (ESS), a Transmitter Receiver Point (TRP) or other appropriate terms. The gNB 203 provides an access point to the 5G-CN/EPC 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 203 is connected to the 5G-CN/EPC 210 via an S1 interface. The 5G-CN/EPC 210 includes an MME 211, other MMES 214, a Service Gateway (S-GW) 212 and a Packet Data Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IP IMSs) and Packet Switching Services (PSSs).

In an embodiment, the gNB 203 corresponds to the base station in the present disclosure.

In an embodiment, the gNB 203 supports data transmission over unlicensed spectrums.

Embodiment 3

Figure 3:
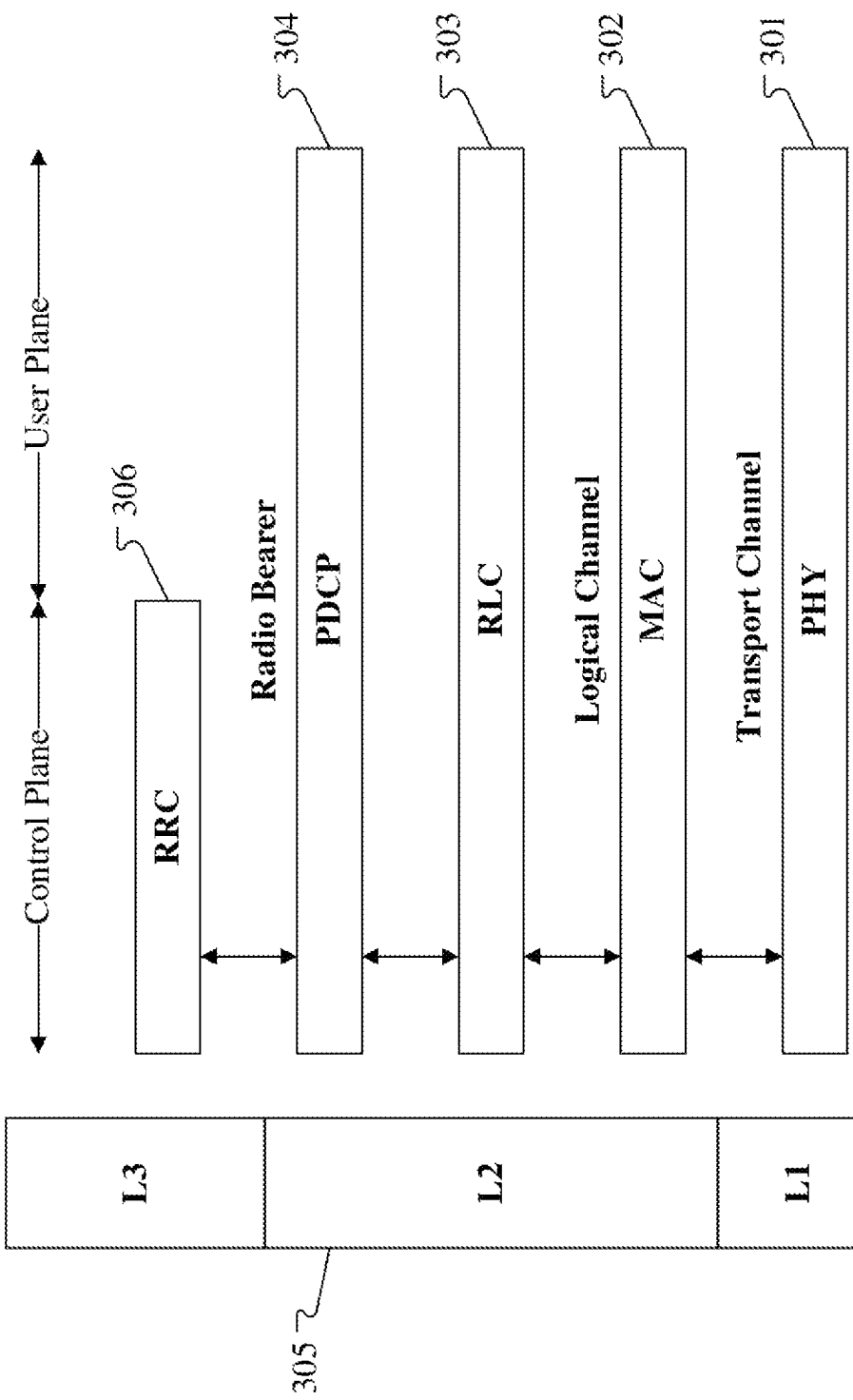
FIG. 3 is a diagram illustrating a radio protocol architecture of a user plane and a control plane according to one embodiment of the present disclosure.

Embodiment 3 illustrates an example of a diagram of a radio protocol architecture of a user plane and a control plane, as shown in FIG. 3.

FIG. 3 is a diagram illustrating an embodiment of a radio protocol architecture of a user plane and a control plane. In FIG. 3, the radio protocol architecture of a UE and a gNB is represented by three layers, which are a layer 1, a layer 2 and a layer 3 respectively. The layer 1 (L1) 301 is the lowest layer and performs signal processing functions of each PHY layer. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may include several higher layers above the L2 305, such as a network layer (i.e. IP layer) terminated at a P-GW of the network side and an application layer terminated at the other side of the connection (i.e. a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a lost packet to as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression function for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using an RRC signaling between the gNB and the UE.

In an embodiment, the radio protocol architecture in FIG. 3 is applicable to the base station in the present disclosure.

In an embodiment, the M1 first-type reference signals in the present disclosure are generated by the PHY 301.

In an embodiment, the M2 second-type radio signals in the present disclosure are generated by the PHY 301.

In an embodiment, the first radio signal in the present disclosure is generated by the PHY 301.

In an embodiment, the first information in the present disclosure is generated by the RRC sublayer 306.

In an embodiment, the first information in the present disclosure is generated by the MAC sublayer 302.

In an embodiment, the first signaling in the present disclosure is generated by the PHY 301.

In an embodiment, the N1 first-type reference signals in the present disclosure are generated by the PHY 301.

In an embodiment, the first uplink information in the present disclosure are generated by the PHY 301.

In an embodiment, the N2 first-type reference signals in the present disclosure are generated by the PHY 301.

In an embodiment, the second uplink information in the present disclosure are generated by the PHY 301.

Embodiment 4

Figure 4:
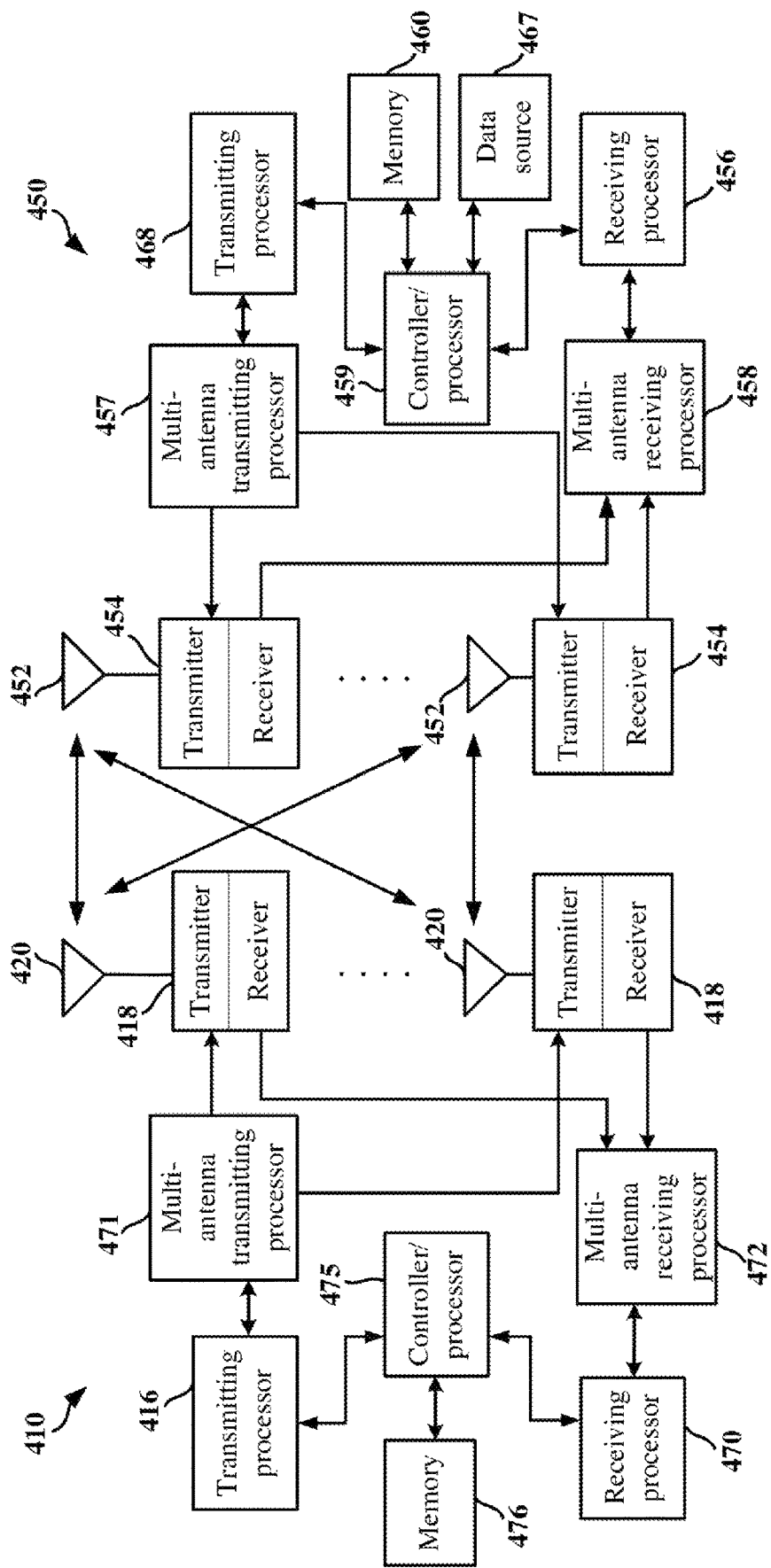
FIG. 4 is a diagram illustrating a NR (New Radio) node B and a given UE according to one embodiment of the present disclosure.

Embodiment 4 illustrates an example of a diagram of an NR node and a UE, as shown in FIG. 4. FIG. 4 is a block diagram of a UE 450 and a gNB 410 that are in communication with each other in an access network.

The gNB 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In Downlink (DL) transmission, at the gNB 410, a higher-layer packet from a core network is provided to the controller/processor 475. The controller/processor 475 provides a function of a layer 2. In downlink transmission, the controller/processor 475 provides header compression, encryption, packet segmentation and reordering, multiplexing between a logical channel and a transport channel, and a radio resource allocation for the UE 450 based on various priorities. The controller/processor 475 is also in charge of HARQ operation, retransmission of a lost packet, and a signaling to the UE 450. The transmitting processor 416 and the multi-antenna transmitting processor 471 perform signal processing functions used for a layer 1 (that is, physical layer). The transmitting processor 416 performs encoding and interleaving so as to enable a (Forward Error Correction FEC) and the mapping to signal clusters corresponding to various modulation scheme (i.e., BPSK, QPSK, M-PSK M-QAM, etc.) at the UE 450 side. The multi-antenna transmitting processor 471 processes the encoded and modulated symbols by a digital spatial precoding/beamforming operation to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams by a transmitting analog precoding/beamforming operation. Each transmitter 418 converts a baseband multicarrier symbol stream provided by the multi-antenna transmitting processor 471 into a radio frequency stream and then provides it to different antennas 420.

In downlink transmission, at the UE 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform signal processing functions of the layer 1. The multi-antenna receiving processor 458 processes the baseband multicarrier symbol stream coming from the receiver 454 by a receiving analog precoding/beamforming operation. The receiving processor 456 converts the baseband multicarrier symbol stream subjected to the receiving analog precoding/beamforming operation from time domain into frequency domain using Fast Fourier Transform (FFT). In the frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the gNB 410. Next, the higher-layer data and control signal are provided to the controller/processor 459. The controller/processor 459 performs functions of the layer 2. The controller/processor 459 can be connected to the memory 460 that stores program code and data. The memory 460 can be called a computer readable media. In downlink transmission, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above layer 2, or various control signals can be provided to the layer 3 for processing. The controller/processor 459 can also perform error detection using ACK and/or NACK protocols to support the HARQ operation.

In the uplink (UL) transmission, at the UE 450, the data source 467 provides a higher-layer packet to the controller/processor 459. The data source 467 represents all protocol layers above the L2 layer. Similar as the transmitting function of the gNB 410 described in downlink transmission, the controller/processor 459 provides header compression, encryption, packet segmentation and reordering, and multiplexing between a logical channel and a transport channel based on the radio resource allocation of the base station 410 so as to provide the functions of the layer 2 used for the control plane and user plane. The controller/processor 459 is also in charge of HARQ operation, retransmission of a lost packet, and signaling to the gNB 410. The transmitting processor 468 conducts modulation mapping and channel encoding processing; the multi-antenna transmitting processor 457 performs digital multi-antenna spatial precoding/beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In uplink transmission, the function of the gNB 410 is similar as the receiving function of the UE 450 described in the downlink transmission. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of the layer 1. The controller/processor 475 provides functions of the layer 2. The controller/processor 475 can be connected to the memory 476 that stores program code and data. The memory 476 can be called a computer readable media. In uplink transmission, the controller/processor 475 provides de-multiplexing between the transport channel and the logical channel, packet reassembling, decryption, header decompression, and control signal processing so as to recover a higher-layer packet coming from the UE 450. The higher-layer packet, coming from the controller/processor 475, may be provided to the core network. The controller/processor 475 can also perform error detection using ACK and/or NACK protocols to support the HARQ operation.

In an embodiment, the UE 450 includes at least one processor and at least one memory. The at least one memory includes computer program codes. The at least one memory and the computer program codes are configured to be used in collaboration with the at least one processor. The UE 450 at least: receives the M1 first-type reference signals in the present disclosure, with the M1 being a positive integer; transmits at least one of the M2 second-type radio signals in the present disclosure in the first time-domain resources in the present disclosure, with any of the M2 second-type radio signals being associated with one of the M1 first-type reference signals, and with the M2 being a positive integer.

In an embodiment, the UE 450 includes a memory that stores a computer readable instruction program. The computer readable instruction program generates an action when executed by at least one processor. The action includes: receiving the M1 first-type reference signals in the present disclosure, with the M1 being a positive integer; transmitting at least one of the M2 second-type radio signals in the present disclosure in the first time-domain resources in the present disclosure, with any of the M2 second-type radio signals being associated with one of the M1 first-type reference signals, and with the M2 being a positive integer.

In an embodiment, the UE 450 includes at least one processor and at least one memory. The at least one memory includes computer program codes. The at least one memory and the computer program codes are configured to be used in collaboration with the at least one processor. The UE 450 at least: receives the first radio signal in the present disclosure in the first time-domain resources in the present disclosure.

In an embodiment, the UE 450 includes a memory that stores a computer readable instruction program. The computer readable instruction program generates an action when executed by at least one processor. The action includes: receiving the first radio signal in the present disclosure in the first time-domain resources in the present disclosure.

In an embodiment, the gNB 410 includes at least one processor and at least one memory. The at least one memory includes computer program codes. The at least one memory and the computer program codes are configured to be used in collaboration with the at least one processor. The gNB 410 at least: transmits the M1 first-type reference signals in the present disclosure, with the M1 being a positive integer; receives the M2 second-type radio signals in the present disclosure in the first time-domain resources in the present disclosure, with any of the M2 second-type radio signals being associated with one of the M1 first-type reference signals, and with the M2 being a positive integer; transmits the first radio signal in the present disclosure in the first time-domain resources. If an antenna port transmitting the first radio signal is associated with at least one of the M2 second-type radio signals, the first-type channel monitoring in the present disclosure is adopted targeting transmission of the first radio signal; otherwise, the second-type channel monitoring in the present disclosure is adopted targeting transmission of the first radio signal.

In an embodiment, the gNB 410 includes a memory that stores a computer readable instruction program. The computer readable instruction program generates an action when executed by at least one processor. The action includes: transmitting the M1 first-type reference signals in the present disclosure, with the M1 being a positive integer; receiving the M2 second-type radio signals in the present disclosure in the first time-domain resources in the present disclosure, with any of the M2 second-type radio signals being associated with one of the M1 first-type reference signals, and with the M2 being a positive integer; transmitting the first radio signal in the present disclosure in the first time-domain resources. If an antenna port transmitting the first radio signal is associated with at least one of the M2 second-type radio signals, the first-type channel monitoring in the present disclosure is adopted targeting transmission of the first radio signal; otherwise, the second-type channel monitoring in the present disclosure is adopted targeting transmission of the first radio signal.

In an embodiment, the gNB 410 corresponds to the base station in the present disclosure.

In an embodiment, at least one of the antenna 452, the receiver 454, the receiving processor 456, the multi-antenna receiving processor 458, or the controller/processor 459 is used for receiving the M1 first-type reference signals in the present disclosure; and at least one of the antenna 420, the transmitter 418, the transmitting processor 416, the multi-antenna transmitting processor 471, or the controller/processor 475 is used for transmitting the M1 first-type reference signals in the present disclosure.

In an embodiment, at least one of the antenna 420, the receiver 418, the receiving processor 470, the multi-antenna receiving processor 472, the controller/processor 475, or the memory 476 is used for receiving the M2 second-type radio signals in the present disclosure in the first time-domain resources in the present disclosure; and at least one of the antenna 452, the transmitter 454, the transmitting processor 468, the multi-antenna transmitting processor 457, the controller/processor 459, the memory 460, or the data source 467 is used for transmitting at least one of the M2 second-type radio signals in the present disclosure in the first time-domain resources in the present disclosure.

In an embodiment, at least one of the antenna 452, the receiver 454, the receiving processor 456, the multi-antenna receiving processor 458, the controller/processor 459, the memory 460, or the data source 467 is used for receiving the first radio signal in the present disclosure in the first time-domain resources in the present disclosure; and at least one of the antenna 420, the transmitter 418, the transmitting processor 416, the multi-antenna transmitting processor 471, the controller/processor 475, or the memory 476 is used for transmitting the first radio signal in the present disclosure in the first time-domain resources in the present disclosure.

In an embodiment, at least one of the antenna 420, the receiver 418, the receiving processor 470, or the multi-antenna receiving processor 472 is used for performing the first-type channel monitoring in the present disclosure.

In an embodiment, at least one of the antenna 420, the receiver 418, the receiving processor 470, or the multi-antenna receiving processor 472 is used for performing the second-type channel monitoring in the present disclosure.

In an embodiment, at least one of the antenna 452, the receiver 454, the receiving processor 456, the multi-antenna receiving processor 458, the controller/processor 459, the memory 460, or the data source 467 is used for receiving the first information in the present disclosure; and at least one of the antenna 420, the transmitter 418, the transmitting processor 416, the multi-antenna transmitting processor 471, the controller/processor 475, or the memory 476 is used for transmitting the first information in the present disclosure.

In an embodiment, at least one of the antenna 452, the receiver 454, the receiving processor 456, the multi-antenna receiving processor 458, the controller/processor 459, the memory 460, or the data source 467 is used for receiving the first signaling in the present disclosure; and at least one of the antenna 420, the transmitter 418, the transmitting processor 416, the multi-antenna transmitting processor 471, the controller/processor 475, or the memory 476 is used for transmitting the first signaling in the present disclosure.

In an embodiment, at least one of the antenna 452, the receiver 454, the receiving processor 456, the multi-antenna receiving processor 458, or the controller/processor 459 is used for receiving the N1 first-type reference signals in the present disclosure; and at least one of the antenna 420, the transmitter 418, the transmitting processor 416, the multi-antenna transmitting processor 471, or the controller/processor 475 is used for transmitting the N1 first-type reference signals in the present disclosure.

In an embodiment, at least one of the antenna 420, the receiver 418, the receiving processor 470, the multi-antenna receiving processor 472, the controller/processor 475, or the memory 476 is used for receiving the first uplink information in the present disclosure; and at least one of the antenna 452, the transmitter 454, the transmitting processor 468, the multi-antenna transmitting processor 457, the controller/processor 459, the memory 460, or the data source 467 is used for transmitting the first uplink information in the present disclosure.

In an embodiment, at least one of the antenna 452, the receiver 454, the receiving processor 456, the multi-antenna receiving processor 458, or the controller/processor 459 is used for receiving the N2 first-type reference signals in the present disclosure; and at least one of the antenna 420, the transmitter 418, the transmitting processor 416, the multi-antenna transmitting processor 471, or the controller/processor 475 is used for transmitting the N2 first-type reference signals in the present disclosure.

In an embodiment, at least one of the antenna 420, the receiver 418, the receiving processor 470, the multi-antenna receiving processor 472, the controller/processor 475, or the memory 476 is used for receiving the second uplink information in the present disclosure; and at least one of the antenna 452, the transmitter 454, the transmitting processor 468, the multi-antenna transmitting processor 457, the controller/processor 459, the memory 460, or the data source 467 is used for transmitting the second uplink information in the present disclosure.

Embodiment 5

Figure 5:
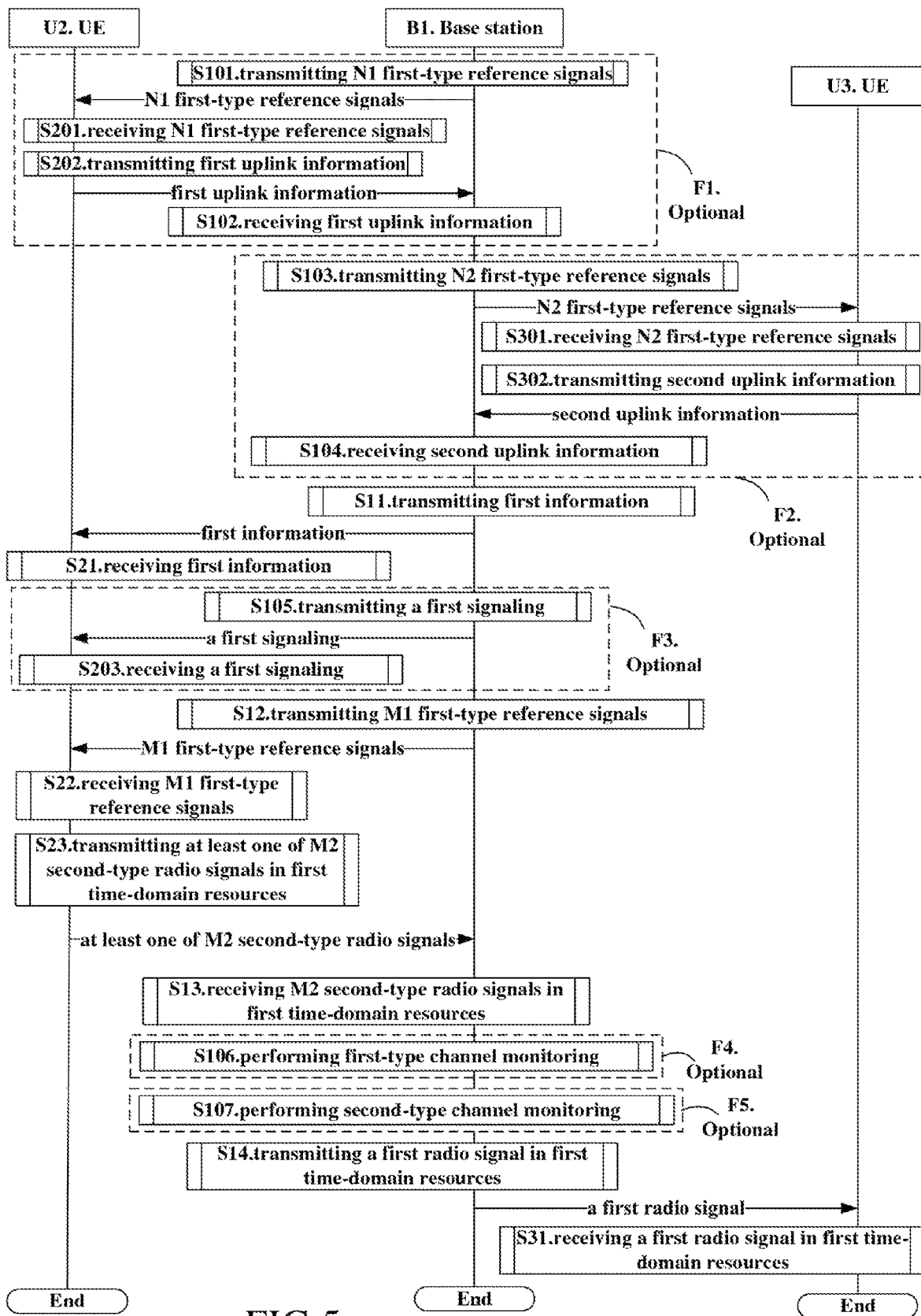
FIG. 5 is a flowchart of wireless transmission according to one embodiment of the present disclosure.

Embodiment 5 illustrates an example of a flowchart of wireless transmission, as shown in FIG. 5. In FIG. 5, a base station B1 is a maintenance base station for a serving cell of a UE U2 and a UE U3. In FIG. 5, steps marked by box F1 to box F5 are optional. The steps marked by boxes F4 and F5 cannot exist simultaneously.

The B1 transmits N1 first-type reference signals in S101, receives first uplink information in S102, transmits N2 first-type reference signals in S103, receives second uplink information in S104, transmits first information in S11, transmits a first signaling in S105, transmits M1 first-type reference signals in S12, receives M2 second-type radio signals in first time-domain resources in S13, performs first-type channel monitoring in S106, performs second-type channel monitoring in S107, and transmits a first radio signal in the first time-domain resources in S14.

The U2 receives N1 first-type reference signals in S201, transmits first uplink information in S202, receives first information in S21, receives a first signaling in S203, receives M1 first-type reference signals in S22, and transmits at least one of M2 second-type radio signals in first time-domain resources in S23.

The U3 receives N2 first-type reference signals in S301, transmits second uplink information in S302, and receives a first radio signal in first time-domain resources in S31.

In Embodiment 5, any of the M2 second-type radio signals is associated with one of the M1 first-type reference signals. If an antenna port transmitting the first radio signal is associated with at least one of the M2 second-type radio signals, first-type channel monitoring is adopted by the B1 targeting the first radio signal; otherwise, second-type channel monitoring is adopted by the B1 targeting the first radio signal. The M1 is a positive integer and the M2 is a positive integer. The first information is used by the U2 for determining at least a part of Q time windows, with time-domain resources occupied by the M2 second-type radio signals belonging to the Q time windows. The Q is a positive integer. The first signaling indicates frequency-domain resources occupied by the M2 second-type radio signals. Measurements targeting the N1 first-type reference signals are used by the U2 for generating the first uplink information, and the first uplink information is used by the B1 for determining the M1 first-type reference signals. The N1 is a positive integer. Measurements targeting the N2 first-type reference signals are used by the U3 for generating the second uplink information, and the second uplink information is used by the B1 for determining a first reference signal, with the antenna port transmitting the first radio signal being associated with the first reference signal. The N2 is a positive integer.

In an embodiment, the antenna port transmitting the first radio signal is associated with at least one of the M2 second-type radio signals, the step marked by the box F4 in FIG. 5 exists and the B1 performs the first-type channel monitoring before transmitting the first radio signal in the first time-domain resources.

In a subembodiment, the first-type channel monitoring is no-LBT.

In a subembodiment, the step marked by the box F5 in FIG. 5 does not exist.

In an embodiment, the antenna port transmitting the first radio signal is associated with at least one of the M2 second-type radio signals, both of the steps marked by the boxes F4 and F5 in FIG. 5 do not exist and the B1 transmits the first radio signal in the first time-domain resources without performing LBT.

In an embodiment, if the antenna port transmitting the first radio signal is associated with at least one of the M2 second-type radio signals, the first-type channel monitoring is used for determining that the first radio signal can be transmitted in the first time-domain resources.

In an embodiment, the antenna port transmitting the first radio signal is not associated with any of the M2 second-type radio signals, the step marked by the box F5 in FIG. 5 exists and the B1 performs the second-type channel monitoring before transmitting the first radio signal in the first time-domain resources.

In a subembodiment, the step marked by the box F4 in FIG. 5 does not exist.

In an embodiment, if the antenna port transmitting the first radio signal is not associated with any of the M2 second-type radio signals, the second-type channel monitoring is used for determining that the first radio signal can be transmitted in the first time-domain resources.

In an embodiment, a probability of transmitting the first radio signal in the first time-domain resources when the first-type channel monitoring is adopted is larger than a probability of transmitting the first radio signal in the first time-domain resources when the second-type channel monitoring is adopted.

In an embodiment, the first-type channel monitoring occupies longer time-domain resources than the second-type channel monitoring.

In an embodiment, a transmission power of one of the M2 second-type radio signals is related to one of the M1 first-type reference signals.

In an embodiment, a transmission power of at least one of the M2 second-type radio signals is related to one of the M1 first-type reference signals.

In an embodiment, a transmission power of any of the M2 second-type radio signals is related to one of the M1 first-type reference signals.

In an embodiment, a transmission power of at least one of the M2 second-type radio signals is not related to any of the M1 first-reference signals.

In an embodiment, a spatial domain transmission filter used for a transmission of one of the M2 second-type radio signals is related to one of the M1 first-type reference signals.

In an embodiment, a spatial domain transmission filter used for a transmission of at least one of the M2 second-type radio signals is related to one of the M1 first-type reference signals.

In an embodiment, a spatial domain transmission filter used for a transmission of any of the M2 second-type radio signals is related to one of the M1 first-type reference signals.

In an embodiment, a spatial domain transmission filter used for a transmission of at least one of the M2 second-type radio signals is not related to any of the M1 first-type reference signals.

In an embodiment, the first information indicates the Q time windows.

In an embodiment, the first information and the first signaling together indicate the Q time windows.

In an embodiment, the M2 second-type radio signals are transmitted by a same UE.

In an embodiment, all of the M2 second-type radio signals are transmitted by the U2.

In an embodiment, at least two of the M2 second-type radio signals are transmitted by different UEs.

In an embodiment, at least one of the M2 second-type radio signals is not transmitted by the U2.

In an embodiment, at least two of the M2 second-type radio signals are transmitted by a same UE.

In an embodiment, at least two of the M2 second-type radio signals are transmitted by the U2.

In an embodiment, the M2 second-type radio signals are transmitted on an uplink physical layer data channel (that is, an uplink channel capable of carrying physical layer data).

In an embodiment, the uplink physical layer data channel is a Physical Uplink Shared Channel (PUSCH).

In an embodiment, the uplink physical layer data channel is a short PUSCH (sPUSCH).

In an embodiment, the uplink physical layer data channel is a New Radio PUS CH (NR-PUSCH).

In an embodiment, the uplink physical layer data channel is a Narrow Band PUSCH (NB-PUSCH).

In an embodiment, the M2 second-type radio signals are transmitted on M2 uplink physical layer data channels (that is, an uplink channel capable of carrying physical layer data) respectively.

In one subembodiment, any of the M2 uplink physical layer data channels is a PUSCH.

In one subembodiment, any of the M2 uplink physical layer data channels is an sPUSCH.

In one subembodiment, any of the M2 uplink physical layer data channels is an NR-PUSCH.

In one subembodiment, any of the M2 uplink physical layer data channels is an NB-PUSCH.

In an embodiment, at least two of the M2 second-type radio signals are transmitted on different uplink physical layer data channels.

In an embodiment, the first radio signal is transmitted on a downlink physical layer control channel (that is, a downlink channel capable of carrying a physical layer signaling only).

In an embodiment, the downlink physical layer control channel is a Physical Downlink Control Channel (PDCCH).

In an embodiment, the downlink physical layer control channel is a short PDCCH (PDCCHs).

In an embodiment, the downlink physical layer control channel is a New Radio PDCCH (NR-PDCCH).

In an embodiment, the downlink physical layer control channel is a Narrow Band PDCCH (NB-PDCCH).

In an embodiment, the first radio signal is transmitted on a downlink physical layer data channel (that is, a downlink channel capable of carrying physical layer data).

In an embodiment, the downlink physical layer data channel is a Physical Downlink Shared Channel (PDSCH).

In an embodiment, the downlink physical layer data channel is a short PDSCH (sPDSCH).

In an embodiment, the downlink physical layer data channel is a New Radio PDSCH (NR-PDSCH).

In an embodiment, the downlink physical layer data channel is a Narrow Band PDSCH (NB-PDSCH).

In an embodiment, the first information is transmitted on a downlink physical layer data channel (that is, a downlink channel capable of carrying physical layer data).

In an embodiment, the first signaling is transmitted on a downlink physical layer control channel (that is, a downlink channel capable of carrying a physical layer signaling only).

In an embodiment, the first uplink information is transmitted on an uplink physical layer control channel (that is, an uplink channel capable of carrying a physical layer signaling only).

In an embodiment, the uplink physical layer control channel is a Physical Uplink Control Channel (PUCCH).

In an embodiment, the uplink physical layer control channel is a short PUCCH (sPUCCH).

In an embodiment, the uplink physical layer control channel is a New Radio PUCCH (NR-PUCCH).

In an embodiment, the uplink physical layer control channel is a Narrow Band PUCCH (NB-PUCCH).

In an embodiment, the first uplink information contains M2 pieces of uplink sub-information, and the M2 pieces of uplink sub-information one-to-one correspond to the M2 second-type radio signals. The M2 pieces of uplink sub-information are transmitted on M2 uplink physical layer control channels respectively.

In a subembodiment, any of the M2 uplink physical layer control channels is a PUCCH.

In a subembodiment, any of the M2 uplink physical layer control channels is an sPUCCH.

In a subembodiment, any of the M2 uplink physical layer control channels is an NR-PUCCH.

In a subembodiment, any of the M2 uplink physical layer control channels is an NB-PUCCH.

In an embodiment, the first uplink information is transmitted on an uplink physical layer data channel (that is, an uplink channel capable of carrying physical layer data).

In an embodiment, the first uplink information contains M2 pieces of uplink sub-information, and the M2 pieces of uplink sub-information one-to-one correspond to the M2 second-type radio signals. The M2 pieces of uplink sub-information are transmitted on M2 uplink physical layer data channels respectively.

In a subembodiment, any of the M2 uplink physical layer data channels is a PUSCH.

In a subembodiment, any of the M2 uplink physical layer data channels is an sPUSCH.

In a subembodiment, any of the M2 uplink physical layer data channels is an NR-PUSCH.

In a subembodiment, any of the M2 uplink physical layer data channels is an NB-PUSCH.

In an embodiment, the second uplink information is transmitted on an uplink physical layer control channel (that is, an uplink channel capable of carrying a physical layer signaling only).

In an embodiment, the second uplink information is transmitted on an uplink physical layer data channel (that is, an uplink channel capable of carrying physical layer data).

Embodiment 6

Figure 6:
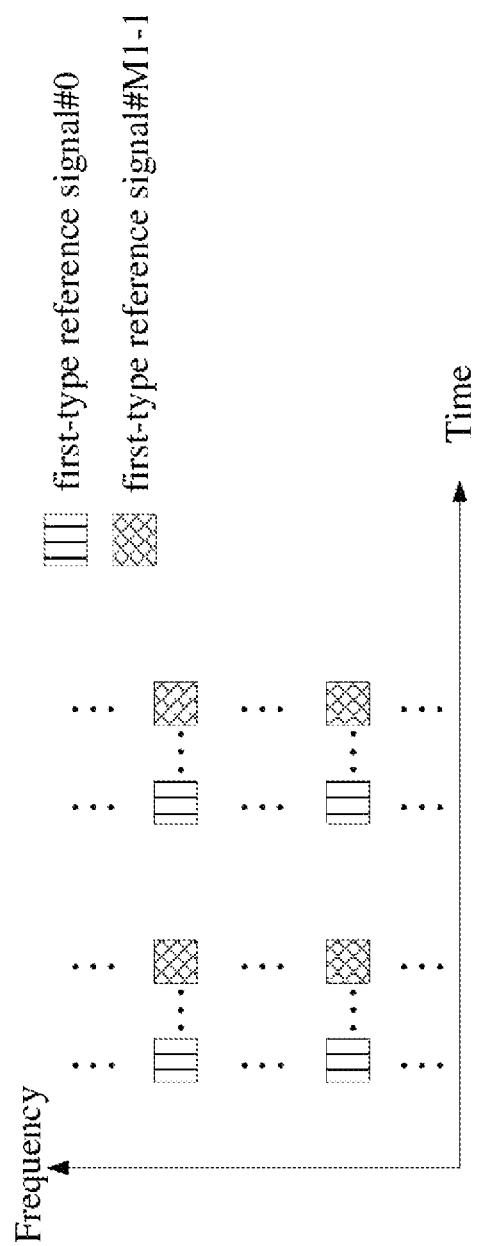
FIG. 6 is a diagram illustrating mapping of M1 first-type reference signals into time and frequency domain according to one embodiment of the present disclosure.

Embodiment 6 illustrates an example of mapping of M1 first-type reference signals into time and frequency domain, as shown in FIG. 6. In FIG. 6, indices of the M1 first-type reference signals are #0, . . . , # M1−1, respectively.

In an embodiment, the M1 first-type reference signals include Channel-State Information Reference Signals (CSI-RS).

In an embodiment, the M1 first-type reference signals include Synchronization Signal (SS).

In a subembodiment, the SS includes at least one of Primary SS (PSS) and Secondary SS (SSS).

In an embodiment, the M1 first-type reference signals include Physical Broadcast Channel (PBCH).

In an embodiment, the M1 first-type reference signals include SS/PBCH Block (SSB).

In an embodiment, the M1 first-type reference signals are wideband reference signals.

In an embodiment, at least one of the M1 first-type reference signals is a wideband reference signal.

In an embodiment, the phrase that a reference signal is a wideband reference signal means: a system bandwidth is divided into an integer number of bandwidth part(s), and the reference signal appears in each of the integer number of bandwidth part(s), wherein each of the integer number of bandwidth part(s) is composed of an integer number of consecutive subcarrier(s).

In an embodiment, the M1 first-type reference signals are narrow-band reference signals.

In an embodiment, at least one of the M1 first-type reference signals is a narrow-band reference signal.

In an embodiment, the phrase that a reference signal is a narrow-band reference signal means: a system bandwidth is divided into an integer number of bandwidth part(s), and the reference signal appears in only a part of the integer number of bandwidth part(s), wherein each of the integer number of bandwidth part(s) is composed of an integer number of consecutive subcarrier(s).

In an embodiment, any two of the integer number of bandwidth parts are composed of a same number of subcarriers.

In an embodiment, the M1 first-type reference signals are periodic.

In an embodiment, at least one of the M1 first-type reference signals is periodic.

In an embodiment, the M1 first-type reference signals are semi-persistent.

In an embodiment, at least one of the M1 first-type reference signals is semi-persistent.

In an embodiment, the M1 first-type reference signals are aperiodic.

In an embodiment, at least one of the M1 first-type reference signals is aperiodic.

In an embodiment, any two of the M1 first-type reference signals occupy orthogonal (non-overlapping) time-domain resources.

In an embodiment, at least two of the M1 first-type reference signals occupy the same (overlapping) time-domain resources.

Embodiment 7

Figure 7:
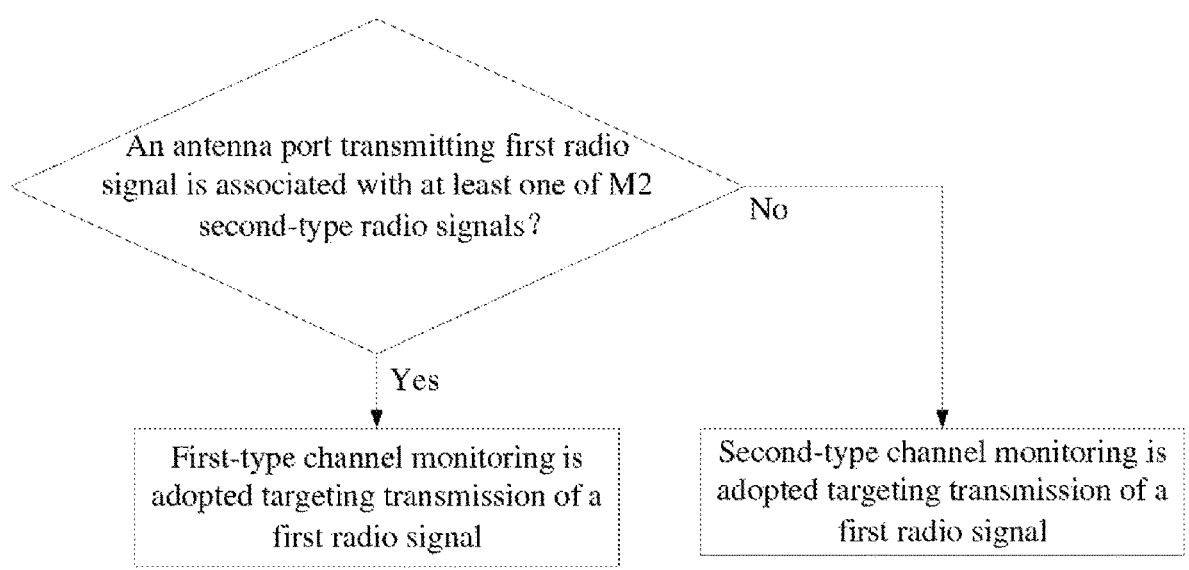
FIG. 7 is a diagram illustrating how to determine whether first-type channel monitoring or second-type channel monitoring is adopted targeting transmission of a first radio signal according to one embodiment of the present disclosure.

Embodiment 7 illustrates an example of how to determine if first-type channel monitoring or second-type channel monitoring is adopted targeting transmission of a first radio signal, as shown in FIG. 7.

In Embodiment 7, if the antenna port transmitting the first radio signal in the present disclosure is associated with at least one of the M2 second-type radio signals in the present disclosure, the first-type channel monitoring is adopted targeting transmission of the first radio signal; otherwise, the second-type channel monitoring is adopted targeting transmission of the first radio signal.

In an embodiment, if the antenna port transmitting the first radio signal is associated with one and only one of the M2 second-type radio signals, the first-type channel monitoring is adopted targeting transmission of the first radio signal.

In an embodiment, if the antenna port transmitting the first radio signal is associated with more than one of the M2 second-type radio signals, the first-type channel monitoring is adopted targeting transmission of the first radio signal.

In an embodiment, if the antenna port transmitting the first radio signal is not associated with any of the M2 second-type radio signals, the second-type channel monitoring is adopted targeting transmission of the first radio signal.

Embodiment 8

Figures 8, 9:
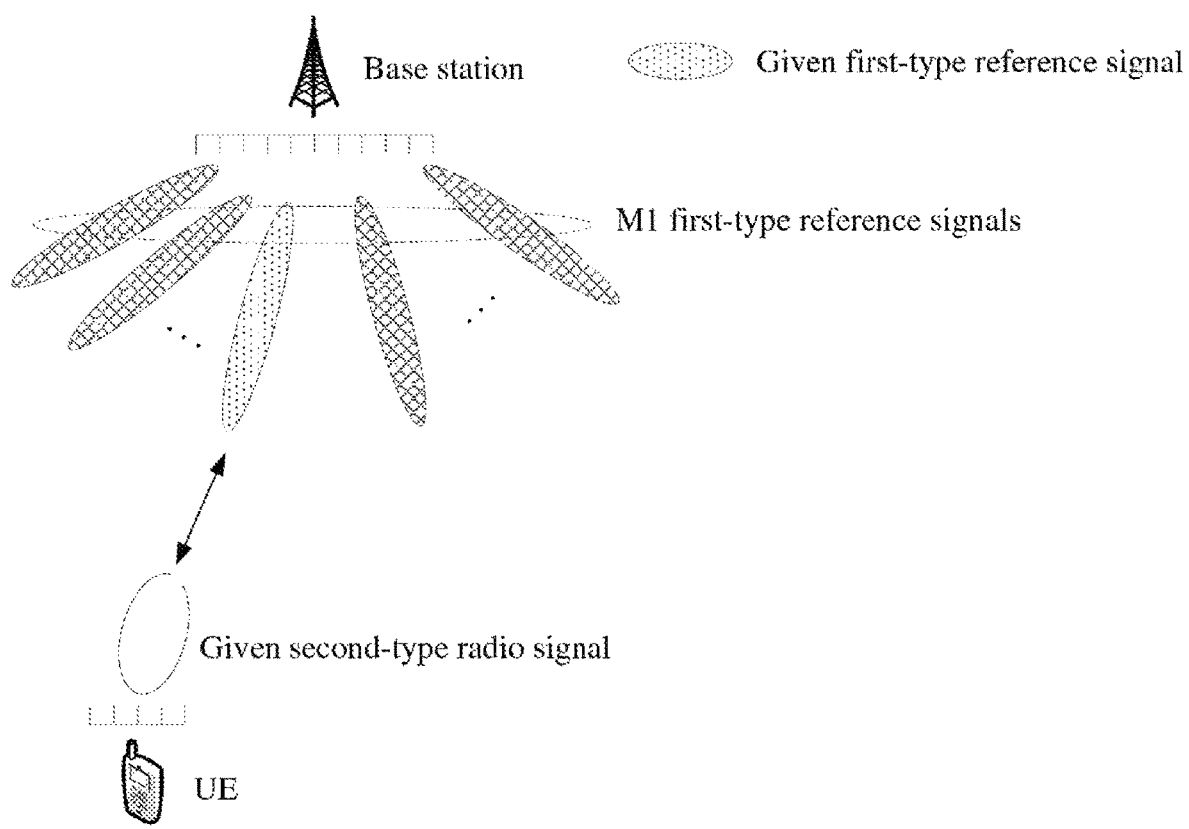
FIG. 8 is a diagram illustrating a transmission power of one of M2 second-type radio signals being related to one of M1 first-type reference signals according to one embodiment of the present disclosure.
FIG. 9 is a diagram illustrating a spatial domain transmission filter used for a transmission of one of M2 second-type radio signals being related to one of M1 first-type reference signals according to one embodiment of the present disclosure.

Embodiment 8 illustrates an example of a transmission power of one of M2 second-type radio signals being related to one of M1 first-type reference signals, as shown in FIG. 8.

In Embodiment 8, for a given second-type radio signal of the M2 second-type radio signals, a transmission power of the given second-type radio signal is related to a given first-type reference signal of the M1 first-type reference signals. The transmission power of the given second-type radio signal is a minimum value between a first reference power and a first power threshold. The first reference power is linear with a first component, and the given first-type reference signal is used for determining the first component.

In an embodiment, the given second-type radio signal is any of the M2 second-type radio signals.

In an embodiment, the first component is related to a quality of a channel between the base station in the present disclosure and a transmitter of the given second-type radio signal.

In an embodiment, the first component is derived by subtracting the Reference Signal Received Power (RSRP) of the given first-type reference signal from a transmission power of the given first-type reference signal.

In an embodiment, the first component is $PL_{b,f,c}(q_d)$, wherein $PL_{b,f,c}(q_d)$ is a downlink path-loss estimate calculated in dB using reference signal index $q_d$ for a downlink BWP that is linked with uplink BWP b of carrier f of serving cell c. The given second-type radio signal is transmitted on uplink BWP b of carrier f of serving cell c. An index of the given first-type reference signal is $q_d$. Refer to 3GPP TS38.213 for a detailed definition of $PL_{b,f,c}(q_d)$.

In an embodiment, a linear coefficient between the first reference power and the first component is a non-negative real number no larger than 1.

In an embodiment, a linear coefficient between the first reference power and the first component is $\alpha_{b,f,c}(j)$, wherein $\alpha_{b,f,c}(j)$ is a partial pathloss compensation factor corresponding to uplink BWP b of carrier f of serving cell c using parameter set configuration with index j. The given second-type radio signal is transmitted on uplink BWP b of carrier f of serving cell c. Refer to 3GPP TS38.213 for a detailed definition of $\alpha_{b,f,c}(j)$.

In an embodiment, the first power threshold is $P_{CMAX,f,c}(i)$, wherein $P_{CMAX,f,c}(i)$ is a configured UE transmit power for carrier f of serving cell c in PUSCH transmission occasion i. The given second-type radio signal is transmitted in PUSCH transmission occasion i on carrier f of serving cell c. Refer to 3GPP TS38.213 for a detailed definition of $P_{CMAX,f,c}(i)$.

In an embodiment, the transmission power of the given second-type radio signal is $P_{PUSCH,b,f,c}(i,j,q_d,l)$, wherein $P_{PUSCH,b,f,c}(i,j,q_d,l)$ is a PUSCH transmission power for a PUSCH transmission occasion i on uplink BWP b of carrier f of serving cell c using parameter set configuration with index j and PUSCH power control adjustment state with index l. The given second-type radio signal is transmitted in PUSCH transmission occasion i on uplink BWP b of carrier f of serving cell c. Refer to 3GPP TS38.213 for a detailed definition of $P_{PUSCH,b,f,c}(i,j,q_d,l)$.

In an embodiment, the transmission power of the given second-type radio signal is in dBm.

In an embodiment, the first reference power is in dBm.

In an embodiment, the first power threshold is in dBm.

In an embodiment, the first reference power is linear with a second component, and a linear coefficient between the first reference power and the second component is 1.

In a subembodiment, the second component is $P_{O\_PUSCH,b,f,c}(j)$, wherein $P_{O\_PUSCH,b,f,c}(j)$ is a parameter for uplink BWP b of carrier f of serving cell c using parameter set configuration with index j. The given second-type radio signal is transmitted on uplink BWP b of carrier f of serving cell c. Refer to 3GPP TS38.213 for a detailed definition of $P_{O\_PUSCH,b,f,c}(j)$.

In an embodiment, the first reference power is linear with a third component, and a linear coefficient between the first reference power and the third component is 1.

In a subembodiment, the third component is $10 \log_{10}(2^\mu M_{RB,b,f,c}^{PUSCH}(i))$, wherein $M_{RB,b,f,c}^{PUSCH}(i)$ is the bandwidth of the PUSCH resource assignment expressed in number of resource blocks for PUSCH transmission occasion i on uplink BWP b of carrier f of serving cell c, and $\mu$ is a configuration of subcarrier spacing. The given second-type radio signal is transmitted in PUSCH transmission occasion i on uplink BWP b of carrier f of serving cell c with configuration of subcarrier spacing $\mu$. Refer to 3GPP TS38.213 for detailed definitions of $M_{RB,b,f,c}^{PUSCH}(i)$ and $\mu$.

In an embodiment, the first reference power is linear with a fourth component, and a linear coefficient between the first reference power and the fourth component is 1.

In a subembodiment, the fourth component is $\Delta_{TF,b,f,c}(i)$, wherein $\Delta_{TF,b,f,c}(i)$ is a power offset related to a Modulation and Coding Scheme (MCS) of the given second-type radio signal for PUSCH transmission occasion i on uplink BWP b of carrier f of serving cell c. The given second-type radio signal is transmitted in PUSCH transmission occasion i on uplink BWP b of carrier f of serving cell c. Refer to 3GPP TS38.213 for a detailed definition of $\Delta_{TF,b,f,c}(i)$.

In an embodiment, the first reference power is linear with a fifth component, and a linear coefficient between the first reference power and the fifth component is 1.

In a subembodiment, the fifth component is $f_{b,f,c}(i, l)$, wherein $f_{b,f,c}(i, l)$ is the PUSCH power control adjustment state of power control process with index l for uplink BWP b of carrier f of serving cell c and PUSCH transmission occasion i. The given second-type radio signal is transmitted in PUSCH transmission occasion i on uplink BWP b of carrier f of serving cell c. Refer to 3GPP TS38.213 for a detailed definition of $f_{b,f,c}(i, l)$.

In an embodiment, the first reference power is linear with the first component, the second component, the third component, the fourth component and the fifth component mentioned above in Embodiment 8, respectively. The coefficients between the first reference power and {the second component, the third component, the fourth component, the fifth component} are all 1, and the coefficient between the first reference power and the first component is a non-negative real number no larger than 1.

Embodiment 9

Embodiment 9 illustrates an example of a spatial domain transmission filter used for a transmission of one of M2 second-type radio signals being related to one of M1 first-type reference signals, as shown in FIG. 9.

In Embodiment 9, for a given second-type radio signal of the M2 second-type radio signals, a given first-type reference signal of the M1 first-type reference signals is used for determining a spatial domain transmission filter used for a transmission of the given second-type radio signal.

In an embodiment, the given second-type radio signal is any of the M2 second-type radio signals.

In an embodiment, the given second-type radio signal is transmitted with a same spatial domain transmission filter used for a reception of the given first-type reference signal.

In an embodiment, a spatial domain receive filter used for a reception of the given first-type reference signal is used for determining the spatial domain transmission filter used for the transmission of the given second-type radio signal.

In an embodiment, a precoding matrix of at least one of the M2 second-type radio signals is determined by one of the M1 first-type reference signals.

In an embodiment, a precoding matrix of any of the M2 second-type radio signals is determined by one of the M1 first-type reference signals.

Embodiment 10

Figure 10:
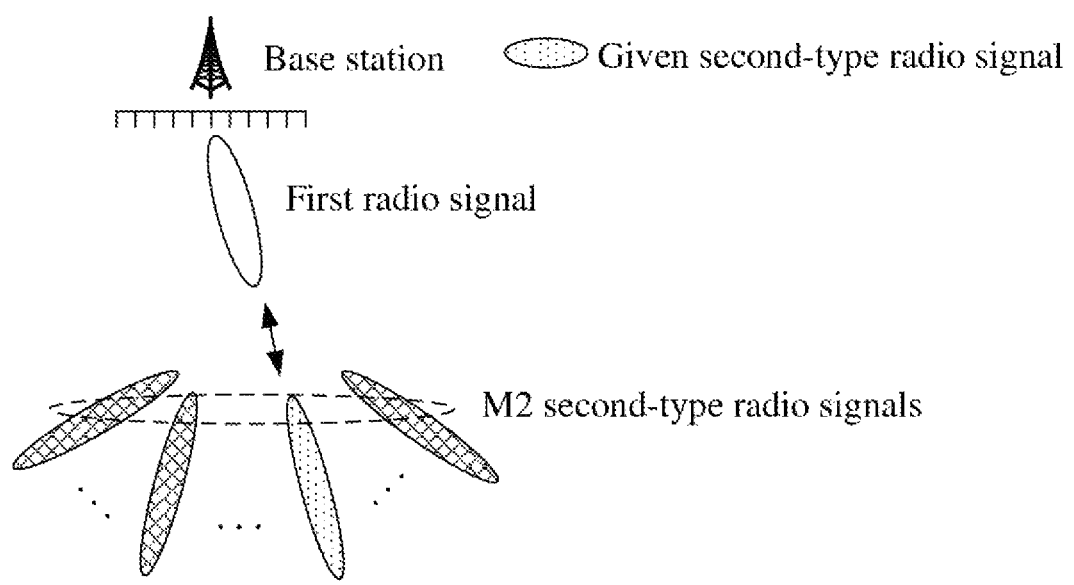
FIG. 10 is a diagram illustrating an antenna port transmitting a first radio signal being associated with one of M2 second-type radio signals according to one embodiment of the present disclosure.

Embodiment 10 illustrates an example of an antenna port transmitting a first radio signal being associated with one of M2 second-type radio signals, as shown in FIG. 10.

In Embodiment 10, the antenna port transmitting the first radio signal is associated with a given second-type radio signal of the M2 second-type radio signals.

In an embodiment, a spatial domain transmission filter used for a transmission of the first radio signal is the same as a spatial domain transmission filter used for a reception of the given second-type radio signal.

In an embodiment, the first radio signal is transmitted with a same spatial domain transmission filter used for a reception of the given second-type radio signal.

In an embodiment, a spatial domain receive filter used for a reception of the given second-type radio signal is used for determining a spatial domain transmission filter used for a transmission of the first radio signal.

In an embodiment, a given reference signal is used for determining the antenna port transmitting the first radio signal, wherein the given reference signal is one of the M1 first-type reference signals that is associated with the given second-type radio signal.

In a subembodiment, the antenna port transmitting the first radio signal and an antenna port transmitting the given reference signal are quasi co-located.

In a subembodiment, at least one antenna port transmitting the first radio signal and at least one antenna port transmitting the given reference signal are quasi co-located.

In a subembodiment, any antenna port transmitting the first radio signal and any antenna port transmitting the given reference signal are quasi co-located.

In a subembodiment, the given reference signal is used for determining a spatial domain transmission filter used for a transmission of the first radio signal.

In a subembodiment, the given reference signal is used for determining a precoding matrix of the first radio signal.

In an embodiment, at least one of the M2 second-type radio signals is used for determining the antenna port transmitting the first radio signal.

In an embodiment, at least one of the M2 second-type radio signals is used for determining a spatial domain transmission filter used for a transmission of the first radio signal.

In an embodiment, at least one of the M2 second-type radio signals is used for determining a precoding matrix of the first radio signal.

Embodiment 11

Figure 11:
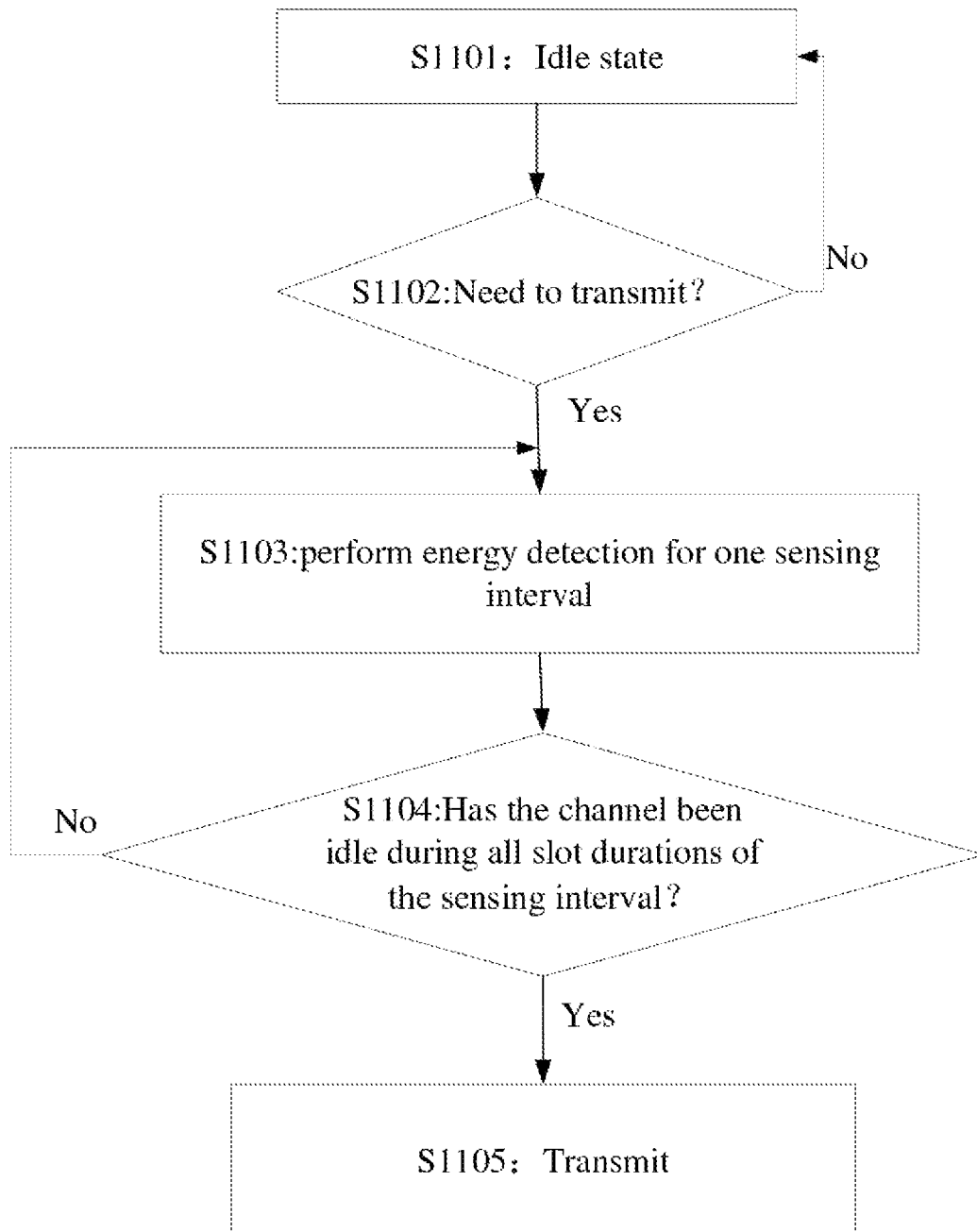
FIG. 11 is a flowchart of first-type channel monitoring according to one embodiment of the present disclosure.

Embodiment 11 illustrates an example of a flowchart of first-type channel monitoring, as shown in FIG. 11.

In Embodiment 11, the first-type channel monitoring is described using a flowchart shown in FIG. 11. In S1101, the base station in the present disclosure is in an idle state. In S1102 determine if transmission is needed. If yes, go to S1103; otherwise, go back to S1101. In S1103 perform energy detection for one sensing interval. In S1104 determine if the channel has been idle during all slot durations of the sensing interval. If yes, go to S1105 and transmit; otherwise, go back to S1103.

In an embodiment, the first-type channel monitoring is LBT.

In an embodiment, the first-type channel monitoring is Clear Channel Assessment (CCA).

In an embodiment, refer to 3GPP TR36.889 for a detailed definition of CCA.

In an embodiment, the first-type channel monitoring is realized using a method described in Section 15 of 3GPP TS36.213.

In an embodiment, the first-type channel monitoring is a downlink channel access procedure.

In an embodiment, the first-type channel monitoring is Category 2 LBT.

In an embodiment, the first-type channel monitoring is one-shot LBT.

In an embodiment, refer to Section 15 of 3GPP TS36.213 for detailed definitions of the sensing interval and the slot duration in FIG. 11.

In an embodiment, the phrase that sense channel for one sensing interval means: performing energy detection during all slot durations of the sensing interval.

In an embodiment, one sensing interval lasts 25 us.

In an embodiment, one sensing interval includes two slot durations, and the two slot durations are discontinuous in time domain.

In a subembodiment, there is a gap of 7 us between the two slot durations.

In an embodiment, if the base station in the present disclosure performs the first-type channel monitoring targeting the first radio signal in the present disclosure, the first-type channel monitoring is not no-LBT.

In an embodiment, if the base station in the present disclosure performs the first-type channel monitoring targeting the first radio signal in the present disclosure, the first-type channel monitoring is Category 2 LBT.

In an embodiment, if the base station in the present disclosure performs the first-type channel monitoring targeting the first radio signal in the present disclosure, the first-type channel monitoring is one-shot LBT.

In an embodiment, an end of time-domain resources occupied by the first-type channel monitoring is no later than a start of time-domain resources occupied by the first radio signal in the present disclosure.

In an embodiment, an end of time-domain resources occupied by the first-type channel monitoring is a start of time-domain resources occupied by the first radio signal in the present disclosure.

In an embodiment, the first-type channel monitoring is used for determining whether a frequency band occupied by the first radio signal in the present disclosure can be used for transmitting the first radio signal in the first time-domain resources in the present disclosure.

In an embodiment, the first-type channel monitoring is used for determining whether the first radio signal in the present disclosure can be transmitted in the first time-domain resources in the present disclosure.

In an embodiment, the first-type channel monitoring is used for determining whether the first radio signal in the present disclosure can be transmitted in the first time-domain resources in the present disclosure in a frequency band occupied by the first radio signal.

In an embodiment, the first-type channel monitoring is used for determining that the first radio signal in the present disclosure can be transmitted in the first time-domain resources in the present disclosure.

In an embodiment, the first-type channel monitoring is used for determining that a frequency band occupied by the first radio signal in the present disclosure is idle in the first time-domain resources in the present disclosure.

In an embodiment, the first-type channel monitoring is used for determining that a frequency band occupied by the first radio signal in the present disclosure can be used for transmitting radio signals by the base station in the first time-domain resources in the present disclosure.

In an embodiment, the frequency band occupied by the first radio signal contains one carrier.

In an embodiment, the frequency band occupied by the first radio signal contains multiple carriers.

In an embodiment, the frequency band occupied by the first radio signal contains one BWP within one carrier.

In an embodiment, the frequency band occupied by the first radio signal contains multiple BWPs within one carrier.

In an embodiment, the frequency band occupied by the first radio signal contains multiple successive subcarriers.

In an embodiment, the frequency band occupied by the first radio signal is a continuous frequency-domain interval.

In an embodiment, a frequency band occupied by the first radio signal is a same frequency band occupied by the M2 second-type signals in the present disclosure.

In an embodiment, a frequency band occupied by the first radio signal is not a same frequency band occupied by the M2 second-type signals in the present disclosure.

Embodiment 12

Figure 12:
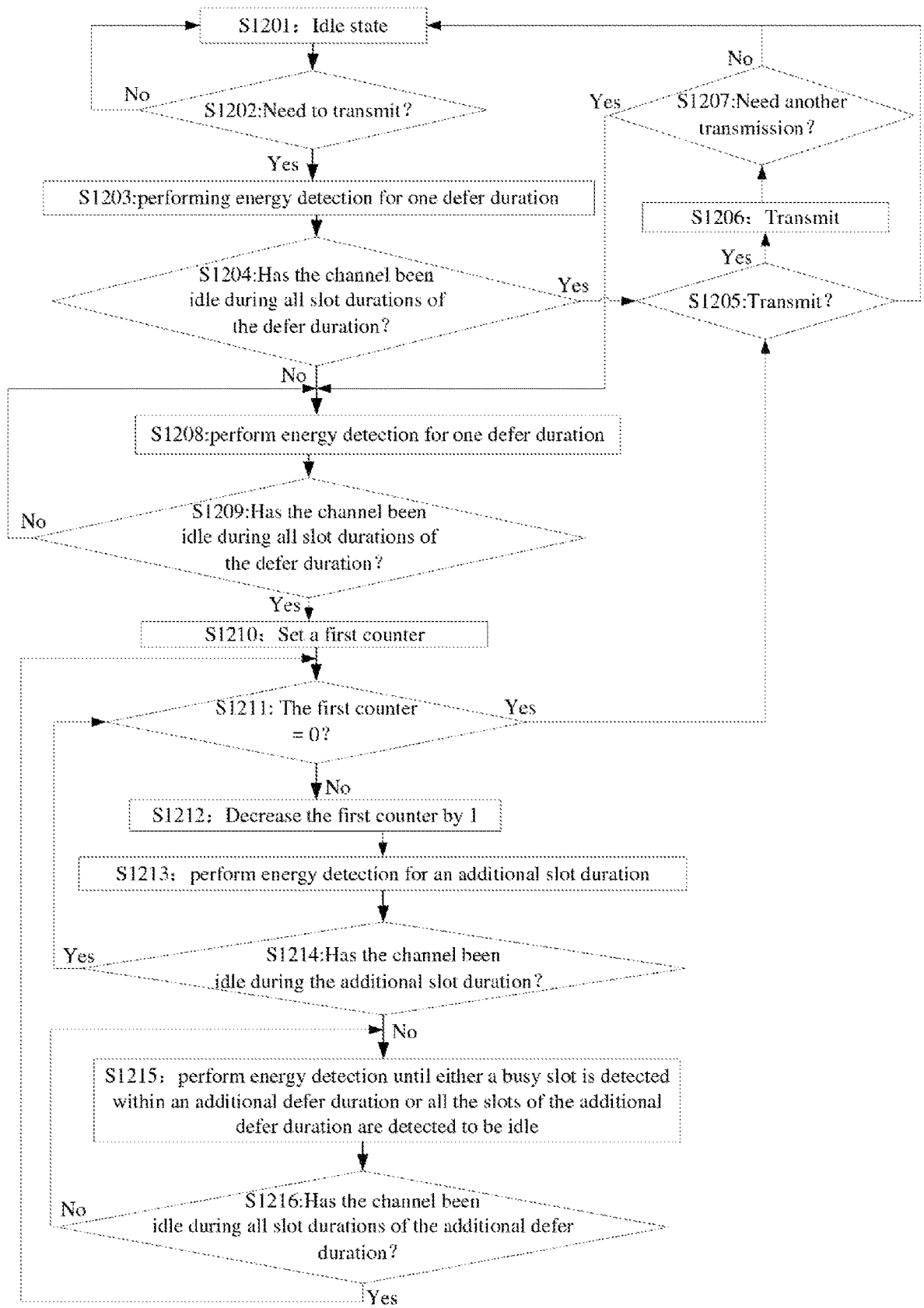
FIG. 12 is a flowchart of second-type channel monitoring according to one embodiment of the present disclosure.

Embodiment 12 illustrates an example of a flowchart of second-type channel monitoring, as shown in FIG. 12.

In Embodiment 12, the second-type channel monitoring is described using a flowchart shown in FIG. 12. In S1201, the base station in the present disclosure is in an idle state. In S1202 determine if transmission is needed. If yes, go to S1203; otherwise, go back to S1201. In S1203 sense channel for one defer duration. In S1204 determine if the channel has been idle during all slot durations of the defer duration. If yes, go to S1205; otherwise, go to S1208. In S1205 determine whether to transmit or not. If yes, go to S1206 and transmit; otherwise, go back to S1201. In S1207 determine if another transmission is needed. If yes, go to S1208; otherwise, go back to S1201. In S1208 sense channel for one defer duration. In S1209 determine if the channel has been idle during all slot durations of the defer duration. If yes, go to S1210; otherwise, go back to S1208. In S1210 set a first counter. In S1211 determine if the first counter equals to 0. If yes, go back to S1205; otherwise, go to S1212. In S1212 decrease the first counter by 1. In S1213 sense channel for an additional slot duration. In S1214 determine if the channel has been idle during the additional slot duration. If yes, go back to S1211; otherwise, go to S1215. In S1215 sense channel until either a busy slot is detected within an additional defer duration or all slots of the additional defer duration are detected to be idle. In S1216 determine if the channel has been idle during all slot durations of the additional defer duration. If yes, go back to S1211; otherwise, go back to S1215.

In an embodiment, refer to Section 15 of 3GPP TS36.213 for detailed definitions of the defer duration, the slot duration, the additional slot duration and the additional defer duration in FIG. 12.

In an embodiment, the phrase that sense channel for a given duration means: performing energy detection during all slot durations of the given duration, wherein the given duration is any one duration of defer durations in S1203 and S1208, additional slot durations in S1213, or additional defer durations in S1215.

In an embodiment, the phrase of performing energy detection in one slot duration means: sensing and averaging power of radio signals in a given time unit to get a receive power, wherein the given time unit is a continuous time period in the given slot duration.

In an embodiment, the phrase of performing energy detection in one slot duration means: sensing and averaging energy of radio signals in a given time unit to get a receive energy, wherein the given time unit is a continuous time period in the given slot duration.

In an embodiment, the phrase that the channel has been idle during one slot duration means that: sense and average power of radio signals in a given time unit to get a receive power, and the receive power is lower than a reference threshold; wherein the given time unit is a continuous time period in the given slot duration.

In an embodiment, the phrase that the channel has been idle during one slot duration means that: sense and average energy of radio signals in a given time unit to get a receive energy, and the receive energy is lower than a reference threshold; wherein the given time unit is a continuous time period in the given slot duration.

In an embodiment, the given time unit lasts no shorter than 4 us.

In an embodiment, a defer duration lasts 16 us plus T1 9 us, wherein the T1 is a positive integer.

In a subembodiment, the T1 belongs to a collection of 1, 2, 3 and 7.

In an embodiment, a defer duration includes multiple slot durations.

In a subembodiment, a first and a second of the multiple slot durations are discontinuous in time domain.

In a subembodiment, there is a gap of 7 us between a first and a second of the multiple slot durations.

In an embodiment, a length of a defer duration equals to a length of an additional defer duration.

In an embodiment, a slot duration lasts 9 us.

In an embodiment, a length of a slot duration equals to a length of an additional slot duration.

In an embodiment, the first counter in S1208 is set as one of P candidate integer values.

In a subembodiment, the P belongs to a collection of 3, 7, 15, 31, 63, 127, 255, 511, and 1023.

In a subembodiment, the P is $CW_p$ of Category 4 LBT.

In a subembodiment, the P candidate integer values are 0, 1, 2, . . . , P−1.

In a subembodiment, the base station randomly chooses one of the P candidate integer values as the first counter.

In a subembodiment, a probability that any of the P candidate integer values is chosen as the first counter is same.

In an embodiment, the second-type channel monitoring is LBT.

In an embodiment, the second-type channel monitoring is Category 4 LBT.

In an embodiment, the second-type channel monitoring is CCA.

In an embodiment, the second-type channel monitoring is realized using a method described in Section 15 of 3GPP TS36.213.

In an embodiment, the second-type channel monitoring is a downlink channel access procedure.

In an embodiment, an end of time-domain resources occupied by the second-type channel monitoring is no later than a start of time-domain resources occupied by the first radio signal in the present disclosure.

In an embodiment, an end of time-domain resources occupied by the second-type channel monitoring is a start of time-domain resources occupied by the first radio signal in the present disclosure.

In an embodiment, the second-type channel monitoring is used for determining whether a frequency band occupied by the first radio signal in the present disclosure can be used for transmitting the first radio signal in the first time-domain resources in the present disclosure.

In an embodiment, the second-type channel monitoring is used for determining whether the first radio signal in the present disclosure can be transmitted in the first time-domain resources in the present disclosure.

In an embodiment, the second-type channel monitoring is used for determining whether the first radio signal in the present disclosure can be transmitted in the first time-domain resources in the present disclosure in a frequency band occupied by the first radio signal.

In an embodiment, the second-type channel monitoring is used for determining that the first radio signal in the present disclosure can be transmitted in the first time-domain resources in the present disclosure.

In an embodiment, the second-type channel monitoring is used for determining that a frequency band occupied by the first radio signal in the present disclosure is idle in the first time-domain resources in the present disclosure.

In an embodiment, the second-type channel monitoring is used for determining that a frequency band occupied by the first radio signal in the present disclosure can be used for transmitting radio signals by the base station in the first time-domain resources in the present disclosure.

Embodiment 13

Figure 13:
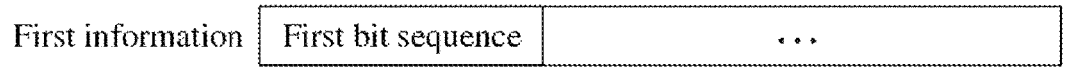
FIG. 13 is a diagram illustrating first information according to one embodiment of the present disclosure.

Embodiment 13 illustrates an example of first information, as shown in FIG. 13.

In Embodiment 13, the first information contains a first bit sequence, wherein the first bit sequence is composed of a positive integer number of bit(s), and the first bit sequence indicates the Q time windows in the present disclosure. The time-domain resources occupied by the M2 second-type radio signals in the present disclosure belong to the Q time windows.

In an embodiment, the first information is carried by a higher-layer signaling.

In an embodiment, the first information is carried by a Radio Resource Control (RRC) signaling.

In an embodiment, the first information is an Information Element (IE).

In an embodiment, the first information contains one or more IEs.

In an embodiment, the first information contains all or a part of information of one or more IEs.

In an embodiment, the first information contains all or a part of information of a ConfiguredGrantConfig IE.

In an embodiment, refer to 3GPP TS38.311 for a detailed definition of the ConfiguredGrantConfig IE.

In an embodiment, the first information contains all or a part of information of a SPS-Config IE.

In an embodiment, refer to 3GPP TS38.311 for a detailed definition of the SPS-Config IE.

In an embodiment, the first information indicates the Q time windows.

In an embodiment, the first information explicitly indicates the Q time windows.

In an embodiment, the first bit sequence is composed of 40 bits.

In an embodiment, the Q time windows are a subset of Q1 time windows, wherein the Q1 is a positive integer no smaller than the Q. The first bit sequence contains Q1 bits, and the Q1 bits respectively correspond to the Q1 time windows. For any given bit of the first bit sequence, if the given bit equals a given value, a corresponding time window of the Q1 time windows is one of the Q time windows; otherwise, the corresponding time window is not one of the Q time windows.

In a subembodiment, the given value is 1.

In a subembodiment, the given value is 0.

In an embodiment, the first information indicates a first-type reference signal of the M1 first-type reference signals that is associated with at least one of the M2 second-type radio signals.

In an embodiment, the first information contains a sixth field, and the sixth field of the first information indicates a first-type reference signal of the M1 first-type reference signals being associated with at least one of the M2 second-type radio signals.

In a subembodiment, the sixth field of the first information contains all or a part of information in a rrc-ConfiguredUplinkGrant field of a ConfiguredGrantConfig IE.

In a subembodiment, the sixth field of the first information contains all or a part of information in a pathlossReferenceIndex field of a ConfiguredGrantConfig IE.

In an embodiment, refer to 3GPP TS38.311 for a detailed definition of the rrc-ConfiguredUplinkGrant field.

In an embodiment, refer to 3GPP TS38.311 for a detailed definition of the pathlossReferenceIndex field.

In an embodiment, the first information is composed of M2 sub-information, and the M2 sub-information indicate M2 window sets respectively. Each of the M2 window sets is composed of a positive integer number of time windows of the Q time windows. The M2 window sets one-to-one correspond to the M2 second-type radio signals, and time-domain resources occupied by any of the M2 second-type radio signals belong to a time window of a corresponding window set of the M2 window sets.

In a subembodiment, the M2 sub-information are transmitted on M2 downlink physical layer data channels respectively.

In a subembodiment, any of the M2 sub-information is an IE.

In a subembodiment, any of the M2 sub-information contains all or a part of information of a ConfiguredGrant-Config IE.

In a subembodiment, any of the M2 sub-information contains all or a part of information of a SPS-Config IE.

In a subembodiment, for any given sub-information of the M2 sub-information, the given sub-information contains a second bit sequence, wherein the second bit sequence is composed of a positive integer number of bits, and the second bit sequence indicates all time windows in a given window set, and the given window set is one of the M2 window sets corresponding to the given sub-information.

In a reference embodiment of the above subembodiment, the given window set is subset of Q2 time windows, wherein the Q2 is a positive integer. The second bit sequence contains Q2 bits, and the Q2 bits one-to-one correspond to the Q2 time windows. For any given bit of the second bit sequence, if the given bit equals a given value, a corresponding time window of the Q2 time windows is one time window of the given window set; otherwise, the corresponding time window is not one time window of the given window set.

In a reference embodiment of the above subembodiment, the second bit sequence is a part of the first bit sequence.

In a subembodiment, the M2 sub-information indicate first-type reference signals of the M1 first-type reference signals that are associated with the M2 second-type radio signals respectively.

In a subembodiment, for any given sub-information of the M2 sub-information, the given sub-information contains a first sub-field. The first sub-field of the given sub-information indicates one of the M1 first-type reference signals that is associated with one of the M2 second-type radio signals corresponding to the given sub-information.

In a reference embodiment of the above subembodiment, the first sub-field of the given sub-information contains all or a part of information in a rrc-ConfiguredUplinkGrant field of a ConfiguredGrantConfig IE.

In a reference embodiment of the above subembodiment, the first sub-field of the given sub-information contains all or a part of information in a pathlossReferenceIndex field of a ConfiguredGrantConfig IE.

Embodiment 14

Figure 14:
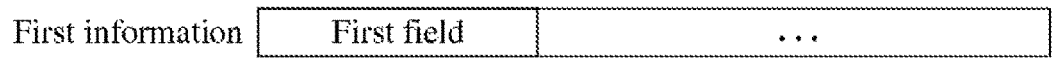
FIG. 14 is a diagram illustrating first information according to one embodiment of the present disclosure.

Embodiment 14 illustrates an example of first information, as shown in FIG. 14.

In Embodiment 14, the first information contains a first field, and the first field of the first information is used for determining the Q time windows in the present disclosure. The time-domain resources occupied by the M2 second-type radio signals in the present disclosure belong to the Q time windows.

In an embodiment, the first field of the first information indicates the Q time windows.

In an embodiment, the first field of the first information contains all or a part of information in a periodicity field of a ConfiguredGrantConfig IE.

In an embodiment, the first field of the first information contains all or a part of information in a timeDomainOffset field of a ConfiguredGrantConfig IE.

In an embodiment, the first field of the first information contains all or a part of information in a timeDomainAllocation field of a ConfiguredGrantConfig IE.

In an embodiment, the first field of the first information contains all or a part of information in a periodicity field of a SPS-Config IE.

In an embodiment, the first information and the first signaling in the present disclosure together indicate the Q time windows.

In an embodiment, the first information is composed of M2 pieces of sub-information, and the M2 pieces of sub-information is used for determining M2 time window sets respectively. Each of the M2 time window sets is composed of a positive integer number of time window(s) of the Q time windows. The M2 time window sets respectively correspond to the M2 second-type radio signals, and time-domain resources occupied by any of the M2 second-type radio signals belong to a time window of a corresponding window set of the M2 window sets.

In a subembodiment, for any given sub-information of the M2 pieces of sub-information, the given sub-information contains a sixth sub-field, wherein the sixth sub-field of the given sub-information is used for determining all time windows in a corresponding window set of the M2 window sets.

In a reference embodiment of the above subembodiment, the sixth sub-field of the given sub-information is a part of the first field of the first information.

Embodiment 15

Figure 15:
FIG. 15 is a diagram illustrating a first signaling according to one embodiment of the present disclosure.

Embodiment 15 illustrates an example of a first signaling, as shown in FIG. 15.

In Embodiment 15, the first signaling contains a second field, and the second field in the first signaling indicates the frequency-domain resources occupied by the M2 second-type radio signals in the present disclosure.

In an embodiment, the first signaling is a physical-layer signaling.

In an embodiment, the first signaling is a dynamic signaling.

In an embodiment, the first signaling is a L1 signaling.

In an embodiment, the first signaling is a L1 control signaling.

In an embodiment, the first signaling contains DCI.

In an embodiment, the first signaling is UE-specific.

In an embodiment, the first signaling is cell common.

In an embodiment, the first signaling is terminal-group specific, where the terminal-group contains a positive integer number of UE(s), and a transmitter of any of the M2 second-type radio signals is one of the UE(s).

In an embodiment, the first signaling contains DCI with CRC scrambled by CS-RNTI.

In an embodiment, the first signaling contains DCI with CRC scrambled by Semi-Persistent Scheduling (SPS)-C-RNTI.

In an embodiment, a DCI format of the first signaling is DCI Format 0A or DCI Format 4A.

In an embodiment, a DCI format of the first signaling is DCI Format 0_0 or DCI Format 0_1.

In an embodiment, refer to 3GPP TS36.212 for detailed definitions of DCI Format 0A and DCI Format 4A.

In an embodiment, refer to 3GPP TS38.212 for detailed definitions of DCI Format 0_0 and DCI Format 0-1.

In an embodiment, the first signaling is used for AUL activation.

In an embodiment, the first signaling is used for activation of Type 2 uplink transmission with configured grant.

In an embodiment, the first signaling explicitly indicates the frequency-domain resources occupied by the M2 second-type radio signals.

In an embodiment, the second field in the first signaling contains all or a part of information in a Frequency domain resource assignment field.

In an embodiment, the second field in the first signaling contains all or a part of information in a Carrier indicator field.

In an embodiment, the second field in the first signaling contains all or a part of information in a Bandwidth part indicator field.

In an embodiment, refer to 3GPP TS38.212 for a detailed definition of the Frequency domain resource assignment field.

In an embodiment, refer to 3GPP TS38.212 for a detailed definition of the Carrier indicator field.

In an embodiment, refer to 3GPP TS38.212 for a detailed definition of the Bandwidth part indicator field.

In an embodiment, the first signaling indicates MCSs of the M2 second-type radio signals.

In an embodiment, the first signaling contains a third field, and the third field of the first signaling indicates MCSs of the M2 second-type radio signals.

In a subembodiment, the third field of the first signaling contains all or a part of information of a Modulation and coding scheme field.

In an embodiment, refer to 3GPP38.212 for a detailed definition of the Modulation and coding scheme field.

In an embodiment, the first signaling indicates an antenna port transmitting the M2 second-type radio signals.

In an embodiment, the first signaling contains a fourth field, and the fourth field of the first signaling indicates an antenna port transmitting the M2 second-type radio signals.

In a subembodiment, the fourth field of the first signaling contains all or a part of information of an SRS resource indicator field.

In a subembodiment, the fourth field of the first signaling contains all or a part of information of a Precoding information and number of layers field.

In a subembodiment, the fourth field of the first signaling indicates a first-type reference signal of the M1 first-type reference signals that is associated with at least one of the M2 second-type radio signals.

In an embodiment, refer to 3GPP TS38.212 for a detailed definition of the SRS resource indicator field.

In an embodiment, refer to 3GPP TS38.212 for a detailed definition of the Precoding information and number of layers field.

In an embodiment, the first signaling indicates a first-type reference signal of the M1 first-type reference signals that is associated with at least one of the M2 second-type radio signals.

In an embodiment, the first signaling is used for determining the Q time windows in the present disclosure.

In an embodiment, the first signaling contains a fifth field, and the fifth field of the first signaling is used for determining the Q time windows in the present disclosure.

In a subembodiment, the fifth field of the first signaling, the first information in the present disclosure and time-domain resources occupied by the first signaling together indicate the Q time windows.

In a subembodiment, the fifth field of the first signaling contains all or a part of information of a Time domain resource assignment field.

In an embodiment, refer to 3GPP TS38.212 for a detailed definition of the Time domain resource assignment field.

In an embodiment, a HARQ process number field of the first signaling is set to all zeros.

In an embodiment, a Redundancy version field of the first signaling is set to all zeros.

In an embodiment, refer to 3GPP TS38.212 for a detailed definition of the HARQ process number field.

In an embodiment, refer to 3GPP TS38.212 for a detailed definition of the Redundancy version field.

In an embodiment, the first signaling is composed of M2 sub-signalings, and the M2 sub-signalings indicate the frequency-domain resources occupied by the M2 second-type radio signals respectively.

In a subembodiment, the M2 sub-signalings are transmitted on M2 downlink physical layer control channels respectively.

In a subembodiment, any of the M2 sub-signalings is a physical-layer signaling.

In a subembodiment, any of the M2 sub-signalings is a L1 signaling.

In a subembodiment, any of the M2 sub-signalings is a L1 control signaling.

In a subembodiment, any of the M2 sub-signalings contains DCI.

In a subembodiment, any of the M2 sub-signalings is UE-specific.

In a subembodiment, any of the M2 sub-signalings contains DCI with CRC scrambled by CS-RNTI.

In a subembodiment, any of the M2 sub-signalings contains DCI with CRC scrambled by SPS-C-RNTI.

In a subembodiment, a DCI format of any of the M2 sub-signalings is DCI

Format 0A or DCI Format 4A.

In a subembodiment, a DCI format of any of the M2 sub-signalings is DCI Format 0_0 or DCI Format 0_1.

In a subembodiment, any of the M2 sub-signalings is used for AUL activation.

In a subembodiment, any of the M2 sub-signalings is used for activation of Type 2 uplink transmission with configured grant.

In a subembodiment, the Q time windows in the present disclosure are divided into M2 window sets, with each of the M2 window sets composed of a positive integer number of time windows of the Q time windows. The M2 window sets one-to-one correspond to the M2 second-type radio signals, and time-domain resources occupied by any of the M2 second-type radio signals belong to a time window of a corresponding window set of the M2 window sets. The M2 sub-signalings are used to activate the M2 window sets respectively.

In a reference embodiment of the above subembodiment, the M2 sub-signalings are used for determining the M2 time window sets respectively.

In a reference embodiment of the above subembodiment, for any given sub-signaling of the M2 sub-signalings, the given sub-signaling contains a fifth sub-field, and the fifth sub-field of the given sub-signaling is used for determining a corresponding window set of the M2 time window sets. The fifth sub-field of the given sub-signaling contains all or a part of information of a Time domain resource assignment field.

In a subembodiment, for any given sub-signaling of the M2 sub-signalings, the given sub-signaling contains a second sub-field, and the second sub-field in the given sub-signaling indicates frequency-domain resources occupied by a corresponding second-type radio signal of the M2 second-type radio signals.

In a reference embodiment of the above subembodiment, the second sub-field in the given sub-signaling contains all or a part of information in a Frequency domain resource assignment field.

In a reference embodiment of the above subembodiment, the second sub-field in the given sub-signaling contains all or a part of information in a Carrier indicator field.

In a reference embodiment of the above subembodiment, the second sub-field in the given sub-signaling contains all or a part of information in a Bandwidth part indicator field.

In a subembodiment, for any given sub-signaling of the M2 sub-signalings, the given sub-signaling indicates an MCS of a corresponding second-type radio signal of the M2 second-type radio signals.

In a subembodiment, for any given sub-signaling of the M2 sub-signalings, the given sub-signaling contains a third sub-field, and the third sub-field of the given sub-signaling indicates an MCS of a corresponding second-type radio signal of the M2 second-type radio signals.

In a reference embodiment of the above subembodiment, the third sub-field of the given sub-signaling contains all or a part of information of a Modulation and coding scheme field.

In a subembodiment, for any given sub-signaling of the M2 sub-signalings, the given sub-signaling indicates an antenna port transmitting a corresponding second-type radio signal of the M2 second-type radio signals.

In a subembodiment, for any given sub-signaling of the M2 sub-signalings, the given sub-signaling contains a fourth sub-field, and the fourth sub-field of the given sub-signaling indicates an antenna port transmitting a corresponding second-type radio signal of the M2 second-type radio signals.

In a reference embodiment of the above subembodiment, the fourth sub-field of the given sub-signaling contains all or a part of information of an SRS resource indicator field.

In a reference embodiment of the above subembodiment, the fourth sub-field of the given sub-signaling contains all or a part of information of a Precoding information and number of layers field.

In a reference embodiment of the above subembodiment, the fourth sub-field of the given sub-signaling indicates a first-type reference signal of the M1 first-type reference signals that is associated with a corresponding second-type radio signal of the M2 second-type radio signals.

In a subembodiment, for any given sub-signaling of the M2 sub-signalings, the given sub-signaling indicates a first-type reference signal of the M1 first-type reference signals that is associated with a corresponding second-type radio signal of the M2 second-type radio signals.

In a subembodiment, a HARQ process number field of any of the M2 sub-signalings is set to all zeros.

In a subembodiment, a Redundancy version field of any of the M2 sub-signalings is set to all zeros.

Embodiment 16

Figure 16:
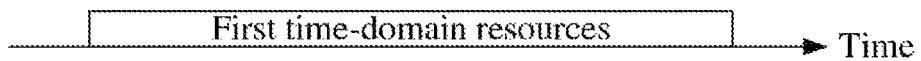
FIG. 16 is a diagram illustrating first time-domain resources according to one embodiment of the present disclosure.

Embodiment 16 illustrates an example of first time-domain resources, as shown in FIG. 16.

In Embodiment 16, the M2 second-type radio signals and the first radio signal in the present disclosure are all transmitted in the first time-domain resources.

In an embodiment, a part of the first time-domain resources belongs to time-domain resources allocated to AUL-based uplink transmission.

In an embodiment, the first time-domain resources belong to time-domain resources allocated to AUL-based uplink transmission.

In an embodiment, a part of the first time-domain resources does not belong to time-domain resources allocated to AUL-based uplink transmission.

In an embodiment, a part of the first time-domain resources belongs to time-domain resources allocated to uplink transmission with configured grant.

In an embodiment, the first time-domain resources belong to time-domain resources allocated to uplink transmission with configured grant.

In an embodiment, a part of the first time-domain resources does not belong to time-domain resources allocated to uplink transmission with configured grant.

In an embodiment, the first time-domain resources are a continuous time period.

In an embodiment, the first time-domain resources contain one or more downlink transmission bursts.

In an embodiment, the first time-domain resources contain one or more downlink transmission bursts and one or more uplink transmission bursts.

In an embodiment, the first time-domain resources contain one COT (Channel Occupancy Time).

In an embodiment, a length of the first time-domain resources is no longer than a MCOT (Maximum COT).

In an embodiment, a length of the first time-domain resources is no longer than $T_{mcot,p}$, wherein the $T_{mcot,p}$ is a maximum channel occupancy time. Refer to 3GPP TS36.213 for a detailed definition of the $T_{mcot,p}$.

In an embodiment, a length of the first time-domain resources is no longer than 10 ms.

In an embodiment, a length of the first time-domain resources is no longer than 8 ms.

In an embodiment, the first time-domain resources are a slot.

In an embodiment, the first time-domain resources are composed of a positive integer number of slot(s).

In an embodiment, the first time-domain resources are a sub-frame.

In an embodiment, the first time-domain resources are composed of a positive integer number of sub-frame(s).

In an embodiment, the first time-domain resources are a COT acquired by a transmitter or transmitters of the M2 second-type radio signals.

In an embodiment, the first time-domain resources contain a COT acquired by a transmitter or transmitters of the M2 second-type radio signals.

In an embodiment, the first time-domain resources contain multiple COTs acquired by transmitters of the M2 second-type radio signals.

In an embodiment, a start of time-domain resources occupied by the first radio signal is no earlier than an end of time-domain resources occupied by the M2 second-type radio signals.

In an embodiment, a gap exists in time-domain between a start of time-domain resources occupied by the first radio signal and an end of time-domain resources occupied by the M2 second-type radio signals.

Embodiment 17

Figure 17:
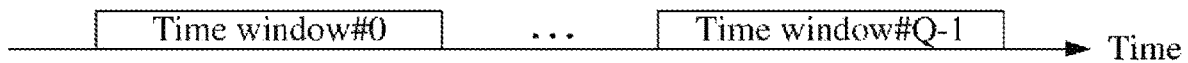
FIG. 17 is a diagram illustrating Q time windows according to one embodiment of the present disclosure.

Embodiment 17 illustrates an example of Q time windows, as shown in FIG. 17. In FIG. 17, indices of the Q time windows are #0, . . . , # Q–1, respectively.

In Embodiment 17, the time-domain resources occupied by the M2 second-type radio signals in the present disclosure belong to the Q time windows.

In an embodiment, the Q is larger than 1.

In an embodiment, any two of the Q time windows are orthogonal (non-overlapping) to each other.

In an embodiment, at least two of the Q time windows are overlapping or partially overlapping.

In an embodiment, the Q time windows are discontinuous in time-domain.

In an embodiment, at least two of the Q time windows are continuous in time-domain.

In an embodiment, any two of the Q time windows have a same length.

In an embodiment, at least two of the Q time windows have different lengths.

In an embodiment, any of the Q time windows is a continuous time period.

In an embodiment, any of the Q time windows is a slot.

In an embodiment, any of the Q time windows is a sub-frame.

In an embodiment, any of the Q time windows contains a positive integer number of multi-carrier symbol(s).

In an embodiment, any of the Q time windows contains a positive integer number of consecutive multi-carrier symbols.

In an embodiment, any of the Q time windows contains a positive integer number of slot(s).

In an embodiment, any of the Q time windows contains a positive integer number of consecutive slots.

In an embodiment, any of the Q time windows contains a positive integer number of sub-frame(s).

In an embodiment, any of the Q time windows contains a positive integer number of consecutive sub-frames.

In an embodiment, a multi-carrier symbol is an Orthogonal Frequency Division Multiplexing (OFDM) symbol.

In an embodiment, a multi-carrier symbol is a Single Carrier-Frequency Division Multiple Access (SC-FDMA) symbol.

In an embodiment, a multi-carrier symbol is a Discrete Fourier Transform Spread OFDM (DFT-S-OFDM) symbol.

In an embodiment, the time-domain resources occupied by the M2 second-type radio signals belong to a same time window of the Q time windows.

In an embodiment, the time-domain resources occupied by the M2 second-type radio signals belong to a first time window of the Q time windows.

In a subembodiment, a transmitter of any of the M2 second-type radio signals chooses the first time window from the Q time windows by itself.

In an embodiment, time-domain resources occupied by any of the M2 second-type radio signals belong to one of the Q time windows.

In an embodiment, for any given second-type radio signal of the M2 second-type radio signals, time-domain resources occupied by the given second-type radio signal belong to a second time window of the Q time windows.

In a subembodiment, a transmitter of the given second-type radio signal chooses the second time window from the Q time windows by itself.

In an embodiment, time-domain resources occupied by at least two of the M2 second-type radio signals belong to different time windows of the Q time windows.

In an embodiment, the Q time windows are divided into M2 time window sets, with each of the M2 time window sets composed of a positive integer number of time windows of the Q time windows. The M2 time window sets respectively correspond to the M2 second-type radio signals, and time-domain resources occupied by any of the M2 second-type radio signals belong to a time window of a corresponding window set of the M2 time window sets.

In a subembodiment, for any given second-type radio signal of the M2 second-type radio signals, a transmitter of the given second-type radio signal chooses a time window from a corresponding window set of the M2 window sets by itself to transmit the given second-type radio signal.

In an embodiment, the first time-domain resource in the present disclosure belongs to the Q time windows.

In an embodiment, the first time-domain resource in the present disclosure belongs to one of the Q time windows.

In an embodiment, the first time-domain resource in the present disclosure belongs to more than one of the Q time windows.

In an embodiment, a part of the first time-domain resource in the present disclosure belongs to the Q time windows.

In an embodiment, a part of the first time-domain resource in the present disclosure belongs to one of the Q time windows.

In an embodiment, a part of the first time-domain resource in the present disclosure belongs to more than one of the Q time windows.

In an embodiment, a part of the first time-domain resource in the present disclosure does not belong to the Q time windows.

In an embodiment, a part of the first time-domain resource in the present disclosure does not belong to any of the Q time windows.

Embodiment 18

Figure 18:
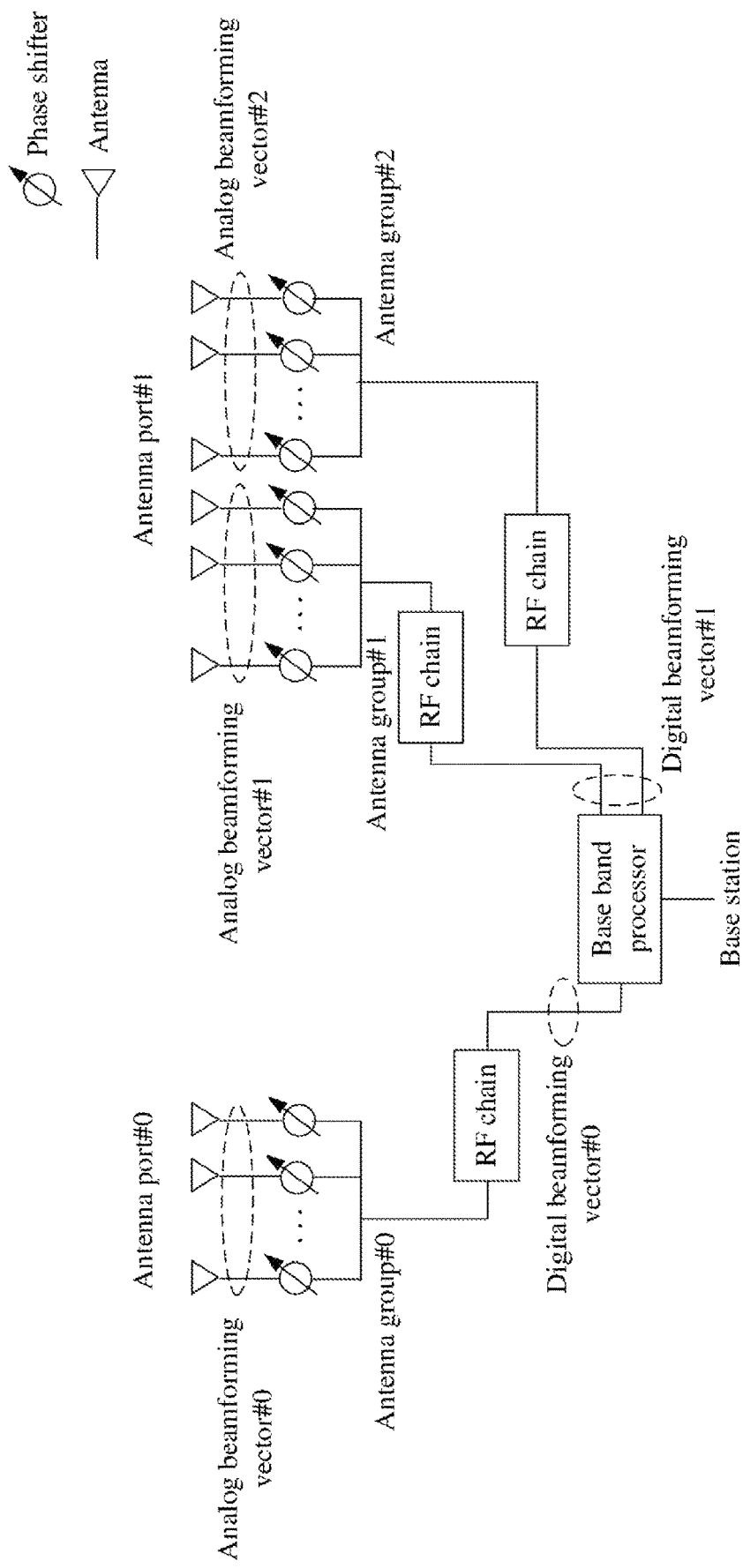
FIG. 18 is a diagram illustrating an antenna port according to one embodiment of the present disclosure.

Embodiment 18 illustrates an example of an antenna port, as shown in FIG. 18.

In Embodiment 18, a given antenna port is formed by superposition of antennas in a positive integer number of antenna group(s) through antenna virtualization. One antenna group is composed of a positive integer number of antenna(s). One antenna group is connected to a base-band processor through a RF (Radio Frequency) chain and different antenna groups correspond to different RF chains. Mapping coefficients from all antennas in the positive integer number of antenna groups to the given antenna port constitute a beamforming vector of the given antenna port. Mapping coefficients from all antennas in an antenna group of the positive integer number of antenna groups to the given antenna port constitute an analog beamforming vector of the antenna group. Analog beamforming vectors of the positive integer number of antenna groups diagonalize to form an analog beamforming matrix of the given antenna port. Mapping coefficients from the positive integer number of antenna groups to the given antenna port constitute a digital beamforming vector of the given antenna port. A beamforming vector of the given antenna port is generated as the product of the analog beamforming matrix of the given antenna port and the digital beamforming vector of the given antenna port.

FIG. 18 shows two antenna ports: antenna port #0 and antenna port #1. The antenna port #0 is composed of antenna group #0, and the antenna port #1 is composed of antenna group #1 and antenna group #2. Mapping coefficients from all antennas in the antenna group #0 to the antenna port #0 constitute analog beamforming vector #0, a mapping coefficient from the antenna group #0 to the antenna port #0 constitutes digital beamforming vector #0, and a beamforming vector of the antenna port #0 is a product of the analog beamforming vector #0 and the digital beamforming vector #0. Mapping coefficients from all antennas in the antenna group #1 and the antenna group #2 to the antenna port #1 constitute analog beamforming vector #1 and analog beamforming vector #2 respectively, mapping coefficients from the antenna group #1 and the antenna group #2 to the antenna port #1 constitute digital beamforming vector #1, and a beamforming vector of the antenna port #1 is a product of the digital beamforming vector #1 and an analog beamforming matrix derived by diagonalization of the analog beamforming vector #1 and the analog beamforming vector #2.

In an embodiment, refer to Section 4.4 of 3GPP TS38.211 for a detailed definition of an antenna port.

In an embodiment, small scale channel parameters of a channel over which a radio signal on the antenna port is conveyed can be used to infer small scale channel parameters of a channel over which another radio signal on the same antenna port is conveyed.

In an embodiment, small scale channel parameters of a channel over which a radio signal on one antenna port is conveyed cannot be used to infer small scale channel parameters of a channel over which a radio signal on another antenna port is conveyed.

In an embodiment, the small scale channel parameters include: at least one of Channel Impulse Response (CIR), Precoding Matrix Indicator (PMI), Channel Quality Indicator (CQI) and Rank Indicator (RI).

In an embodiment, an antenna port is composed of only one antenna group, i.e., one RF chain, e.g., the antenna port #0 in FIG. 18.

In a subembodiment, an analog beamforming matrix of the antenna port is dimensionally reduced to an analog beamforming vector, and a digital beamforming vector of the antenna port is dimensionally reduced to a scalar. A beamforming vector of the antenna port equals to its analog beamforming vector. For example, the antenna port #0 in FIG. 18 is composed of only the antenna group #0. The digital beamforming vector #0 in FIG. 18 is dimensionally reduced to a scalar, and the beamforming vector of the antenna group #0 is the analog beamforming vector #0.

In an embodiment, an antenna port is composed of multiple antenna groups, i.e., multiple RF chains, e.g., the antenna port #1 in FIG. 18.

In an embodiment, two antenna ports are said to be quasi co-located if large-scale properties of a channel over which a radio signal on one antenna port is conveyed can be used to infer large-scale properties of a channel over which a symbol on the other antenna port is conveyed.

In an embodiment, the large-scale properties include one or more of delay spread, Doppler spread, Doppler shift, average gain, average delay, and spatial Rx parameters.

In an embodiment, refer to Section 4.4 of 3GPP TS38.211 for a detailed definition of two antenna ports being quasi co-located.

In an embodiment, the spatial Rx parameters include one or more of receive beam, receive analog beamforming matrix, receive analog beamforming vector, receive digital beamforming vector, receive beamforming vector, and spatial domain receive filter.

Embodiment 19

Figure 19:
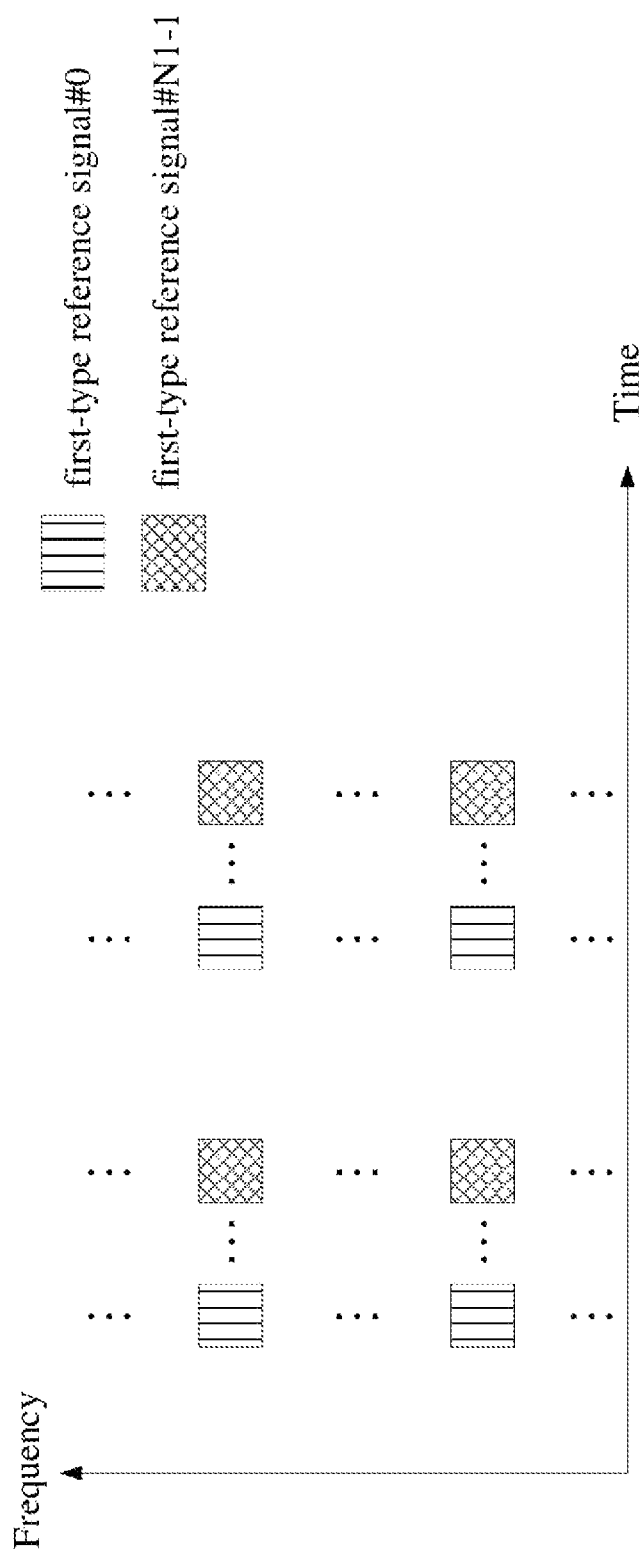
FIG. 19 is a diagram illustrating mapping of N1 first-type reference signals into time and frequency domain according to one embodiment of the present disclosure.

Embodiment 19 illustrates an example of mapping of N1 first-type reference signals into time and frequency domain, as shown in FIG. 19.

In Embodiment 19, measurements targeting the N1 first-type reference signals are used for generating the first uplink information in the present disclosure, and the first uplink information is used for determining the M1 first-type reference signals in the present disclosure.

In an embodiment, the N1 first-type reference signals include CSI-RS

In an embodiment, the N1 first-type reference signals include SS.

In an embodiment, the N1 first-type reference signals include SSB.

In an embodiment, the N1 first-type reference signals are periodic.

In an embodiment, at least one of the N1 first-type reference signals is periodic.

In an embodiment, the N1 first-type reference signals are semi-persistent.

In an embodiment, at least one of the N1 first-type reference signals is semi-persistent.

In an embodiment, the N1 first-type reference signals are aperiodic.

In an embodiment, at least one of the N1 first-type reference signals is aperiodic.

In an embodiment, the N1 is larger than the M1.

In an embodiment, the M1 first-type reference signals are a subset of the N1 first-type reference signals.

In an embodiment, the first uplink information includes UCI.

In an embodiment, the first uplink information includes Channel-state information reference signals Resource Indicator (CRI).

In an embodiment, the first uplink information includes Channel State Information (CSI).

In an embodiment, the CSI includes one or more of RI, CRI, PMI, RSRP, Reference Signal Received Quality (RSRQ), and CQI.

In an embodiment, the first uplink information is composed of M2 pieces of uplink sub-information, and the M2 pieces of uplink sub-information respectively correspond to the M2 second-type radio signals in the present disclosure.

In a subembodiment, each piece of the M2 pieces of uplink sub-information includes UCI.

In a subembodiment, each piece of the M2 pieces of uplink sub-information includes CRI.

In a subembodiment, each piece of the M2 pieces of uplink sub-information includes CSI.

In a subembodiment, for any given second-type radio signal of the M2 second-type radio signals, a piece of corresponding uplink sub-information of the M2 pieces of uplink sub-information indicates a first target first-type reference signal of the N1 first-type reference signals. The first target first-type reference signal is used for determining a first-type reference signal of the M1 first-type reference signals associated with the given second-type radio signal. The measurements targeting the N1 first-type reference signals are used for generating N1 channel qualities respectively, and the first target first-type reference signal corresponds to a largest one of the N1 channel qualities.

In a reference embodiment of the above subembodiment, an antenna port transmitting the first target first-type reference signal and an antenna port transmitting the first-type reference signal of the M1 first-type reference signals associated with the given second-type radio signal are quasi co-located.

In a reference embodiment of the above subembodiment, any antenna port transmitting the first target first-type reference signal and any antenna port transmitting the first-type reference signal of the M1 first-type reference signals associated with the given second-type radio signal are quasi co-located.

In a reference embodiment of the above subembodiment, at least one antenna port transmitting the first target first-type reference signal and at least one antenna port transmitting the first-type reference signal of the M1 first-type reference signals associated with the given second-type radio signal are quasi co-located.

In a reference embodiment of the above subembodiment, the first target first-type reference signal is the first-type reference signal of the M1 first-type reference signals associated with the given second-type radio signal.

In a reference embodiment of the above subembodiment, the N1 channel qualities are all RSRP.

In a reference embodiment of the above subembodiment, the N1 channel qualities are all RSRQ.

In a reference embodiment of the above subembodiment, the N1 channel qualities are all CQI.

Embodiment 20

Figure 20:
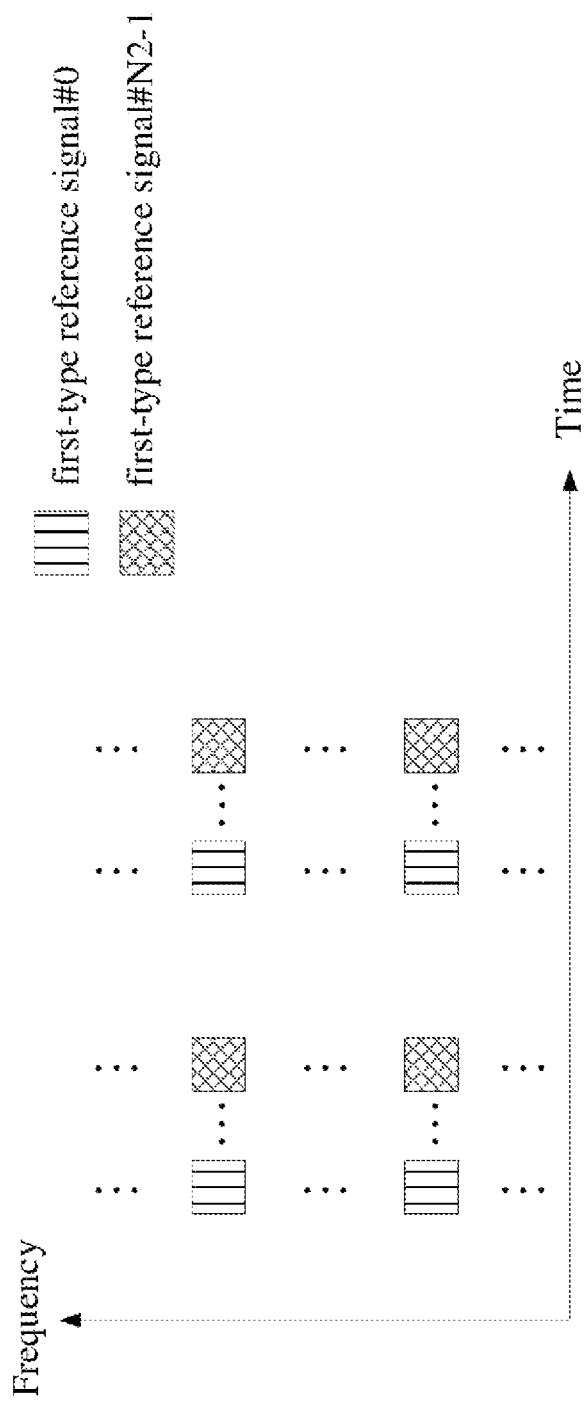
FIG. 20 is a diagram illustrating mapping of N2 first-type reference signals into time and frequency domain according to one embodiment of the present disclosure.

Embodiment 20 illustrates an example of mapping of N2 first-type reference signals into time and frequency domain, as shown in FIG. 20.

In Embodiment 20, measurements targeting the N2 first-type reference signals are used for generating the second uplink information in the present disclosure, and the second uplink information is used for determining a first reference signal, wherein the antenna port transmitting the first radio signal in the present disclosure is associated with the first reference signal.

In an embodiment, the N2 first-type reference signals include CSI-RS

In an embodiment, the N2 first-type reference signals include SS.

In an embodiment, the N2 first-type reference signals include SSB.

In an embodiment, the N2 first-type reference signals are periodic.

In an embodiment, at least one of the N2 first-type reference signals is periodic.

In an embodiment, the N2 first-type reference signals are semi-persistent.

In an embodiment, at least one of the N2 first-type reference signals is semi-persistent.

In an embodiment, the N2 first-type reference signals are aperiodic.

In an embodiment, at least one of the N2 first-type reference signals is aperiodic.

In an embodiment, the N2 first-type reference signals are a subset of the N1 first-type reference signals in the present disclosure.

In an embodiment, at least one of the N2 first-type reference signals belongs to the N1 first-type reference signals in the present disclosure.

In an embodiment, the second uplink information includes UCI.

In an embodiment, the second uplink information includes CRI.

In an embodiment, the second uplink information includes CSI.

In an embodiment, the antenna port transmitting the first radio signal and an antenna port transmitting one of the N2 first-type reference signals are quasi co-located.

In an embodiment, the second uplink information indicates a second target first-type reference signal out of the N2 first-type reference signals, and the second target first-type reference signal is used for determining the first reference signal. The measurements targeting the N2 first-type reference signals are used for generating N2 channel qualities respectively, and the second target first-type reference signal corresponds to a largest one of the N2 channel qualities.

In a subembodiment, the first reference signal is the second target first-type reference signal.

In a subembodiment, an antenna port transmitting the first reference signal and an antenna port transmitting the second target first-type reference signal are quasi co-located.

In a subembodiment, any antenna port transmitting the first reference signal and any antenna port transmitting the second target first-type reference signal are quasi co-located.

In a subembodiment, at least one antenna port transmitting the first reference signal and at least one antenna port transmitting the second target first-type reference signal are quasi co-located.

In a subembodiment, the N2 channel qualities are all RSRP.

In a subembodiment, the N2 channel qualities are all RSRQ.

In a subembodiment, the N2 channel qualities are all CQI.

In an embodiment, the antenna port transmitting the first radio signal and an antenna port transmitting the first reference signal are quasi co-located.

In an embodiment, any antenna port transmitting the first radio signal and any antenna port transmitting the first reference signal are quasi co-located.

In an embodiment, at least one antenna port transmitting the first radio signal and at least one antenna port transmitting the first reference signal are quasi co-located.

In an embodiment, the first reference signal is one of the M1 first-type reference signals.

In an embodiment, the first reference signal is not one of the M1 first-type reference signals.

In an embodiment, the first reference signal is one of the M1 first-type reference signals, and the first-type channel monitoring is adopted targeting transmission of the first radio signal.

In an embodiment, the first reference signal is not one of the M1 first-type reference signals, and the second-type channel monitoring is adopted targeting transmission of the first radio signal.

Embodiment 21

Figure 21:
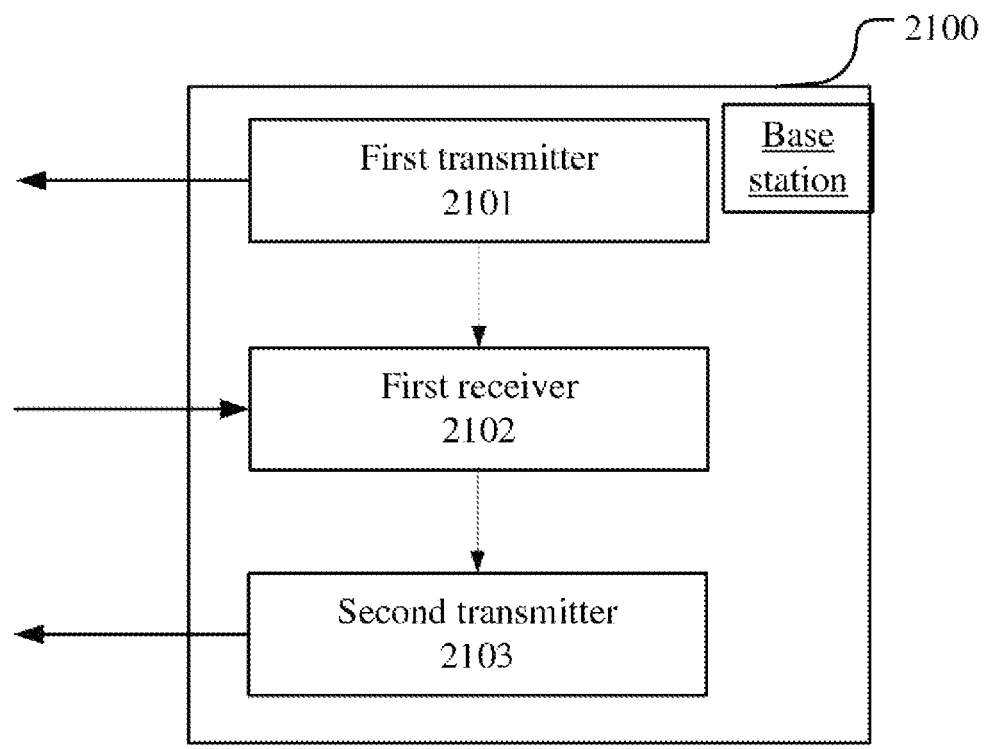
FIG. 21 is a structure block diagram illustrating a processing device in a base station according to one embodiment of the present disclosure.

Embodiment 21 illustrates an example of a structure block diagram of a processing device in a base station, as shown in FIG. 21. In FIG. 21, the processing device 2100 in the base statin is mainly composed of a first transmitter 2101, a first receiver 2102 and a second transmitter 2103.

In Embodiment 21, the first transmitter transmits M1 first-type reference signals, with the M1 being a positive integer; the first receiver receives M2 second-type radio signals in first time-domain resources, with any of the M2 second-type radio signals being associated with one of the M1 first-type reference signals, and with the M2 being a positive integer; and the second transmitter transmits a first radio signal in the first time-domain resources.

In Embodiment 21, if an antenna port transmitting the first radio signal is associated with at least one of the M2 second-type radio signals, first-type channel monitoring is adopted targeting transmission of the first radio signal; otherwise, second-type channel monitoring is adopted targeting transmission of the first radio signal. The M1 and M2 are positive integers, respectively.

In an embodiment, the first receiver 2102 further performs the first-type channel monitoring, wherein the antenna port transmitting the first radio signal is associated with at least one of the M2 second-type radio signals.

In an embodiment, the first receiver 2102 further performs the second-type channel monitoring, wherein the antenna port transmitting the first radio signal is not associated with any of the M2 second-type radio signals.

In an embodiment, a probability of transmitting the first radio signal in the first time-domain resources when the first-type channel monitoring is adopted is larger than a probability of transmitting the first radio signal in the first time-domain resources when the second-type channel monitoring is adopted.

In an embodiment, a transmission power of one of the M2 second-type radio signals is related to one of the M1 first-type reference signals.

In an embodiment, a spatial domain transmission filter used for a transmission of one of the M2 second-type radio signals is related to one of the M1 first-type reference signals.

In an embodiment, the first transmitter 2101 further transmits first information, wherein the first information is used for determining Q time windows, with time-domain resources occupied by the M2 second-type radio signals belonging to the Q time windows; and the Q is a positive integer.

In an embodiment, the first transmitter 2101 further transmits a first signaling, wherein the first signaling indicates frequency-domain resources occupied by the M2 second-type radio signals.

In an embodiment, the first transmitter 2101 further transmits N1 first-type reference signals and the first receiver 2102 further receives first uplink information, wherein measurements targeting the N1 first-type reference signals are used for generating the first uplink information, and the first uplink information is used for determining the M1 first-type reference signals, and the N1 is a positive integer.

In an embodiment, the first transmitter 2101 further transmits N2 first-type reference signals and the first receiver 2102 further receives second uplink information, wherein measurements targeting the N2 first-type reference signals are used for generating the second uplink information, and the second uplink information is used for determining a first reference signal, with the antenna port transmitting the first radio signal being associated with the first reference signal, and the N2 is a positive integer.

In an embodiment, the first transmitter 2101 contains at least one of the antenna 420, the transmitter 418, the transmitting processor 416, the multi-antenna transmitting processor 471, the controller/processor 475, or the memory 476 in Embodiment 4.

In an embodiment, the first receiver 2102 contains at least one of the antenna 420, the receiver 418, the receiving processor 470, the multi-antenna receiving processor 472, the controller/processor 475, or the memory 476 in Embodiment 4.

In an embodiment, the second transmitter 2103 contains at least one of the antenna 420, the transmitter 418, the transmitting processor 416, the multi-antenna transmitting processor 471, the controller/processor 475, or the memory 476 in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, tele-controlled aircrafts, aircrafts, diminutive airplanes, mobile phones, tablet computers, notebooks, vehicle-mounted communication equipment, wireless sensor, network cards, terminals for Internet of Things (TOT), RFID terminals, NB-IOT terminals, Machine Type Communication (MTC) terminals, enhanced MTC (eMTC) terminals, data cards, low-cost mobile phones, low-cost tablet computers, and other radio communication equipment. The base station or system equipment in the present application includes but is not limited to macro-cellular base stations, micro-cellular base stations, home base stations, relay base station, gNB (NR Node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a base station for wireless communication, comprising:
   transmitting M1 first-type reference signals, with the M1 being a positive integer;
   receiving M2 second-type radio signals in first time-domain resources, with any of the M2 second-type radio signals being associated with one of the M1 first-type reference signals, and with the M2 being a positive integer; and
   transmitting a first radio signal in the first time-domain resources;
   wherein determination of which one of first-type channel monitoring or second-type channel monitoring is adopted for targeting transmission of the first radio signal is as follows: in instances in which an antenna port transmitting the first radio signal is associated with at least one of the M2 second-type radio signals, the first-type channel monitoring is adopted for targeting transmission of the first radio signal; and in instances in which any antenna port transmitting the first radio signal is not associated with any of the M2 second-type radio signals, the second-type channel monitoring is adopted for targeting transmission of the first radio signal.

2. The method according to claim 1, further comprising:
   performing the first-type channel monitoring;
   wherein the antenna port transmitting the first radio signal is associated with at least one of the M2 second-type radio signals.

3. The method according to claim 1, further comprising:
   performing the second-type channel monitoring;
   wherein the antenna port transmitting the first radio signal is not associated with any of the M2 second-type radio signals.

4. The method according to claim 1, wherein a probability of transmitting the first radio signal in the first time-domain resources when the first-type channel monitoring is adopted is larger than a probability of transmitting the first radio signal in the first time-domain resources when the second-type channel monitoring is adopted.

5. The method according to claim 1, wherein a transmission power of one of the M2 second-type radio signals is related to one of the M1 first-type reference signals.

6. The method according to claim 1, wherein a spatial domain transmission filter used for a transmission of one of the M2 second-type radio signals is related to one of the M1 first-type reference signals.

7. The method according to claim 1, further comprising:
   transmitting first information;
   wherein the first information is used for determining Q time windows, with time-domain resources occupied by the M2 second-type radio signals belonging to the Q time windows; and the Q is a positive integer.

8. The method according to claim 1, further comprising:
   transmitting a first signaling;
   wherein the first signaling indicates frequency-domain resources occupied by the M2 second-type radio signals.

9. The method according to claim 1, further comprising:
   transmitting N1 first-type reference signals;
   receiving first uplink information;
   wherein measurements targeting the N1 first-type reference signals are used for generating the first uplink information; and the first uplink information is used for determining the M1 first-type reference signals; and the N1 is a positive integer.

10. The method according to claim 1, further comprising:
    transmitting N2 first-type reference signals;
    receiving second uplink information;
    wherein measurements targeting the N2 first-type reference signals are used for generating the second uplink information; and the second uplink information is used for determining a first reference signal, with the antenna port transmitting the first radio signal being associated with the first reference signal; and the N2 is a positive integer.

11. A base station for wireless communication, comprising:
    a first transmitter, to transmit M1 first-type reference signals, with the M1 being a positive integer;
    a first receiver, to receive M2 second-type radio signals in first time-domain resources, with any of the M2 second-type radio signals being associated with one of the M1 first-type reference signals, and with the M2 being a positive integer; and
    a second transmitter, to transmit a first radio signal in the first time-domain resources;
    wherein determination of which one of first-type channel monitoring or second-type channel monitoring is adopted for targeting transmission of the first radio signal is as follows: in instances in which an antenna port transmitting the first radio signal is associated with at least one of the M2 second-type radio signals, the first-type channel monitoring is adopted for targeting transmission of the first radio signal; and in instances in which any antenna port transmitting the first radio signal is not associated with any of the M2 second-type radio signals, the second-type channel monitoring is adopted for targeting transmission of the first radio signal.

12. The base station according to claim 11, wherein the first receiver further performs the first-type channel monitoring; wherein the antenna port transmitting the first radio signal is associated with at least one of the M2 second-type radio signals.

13. The base station according to claim 11, wherein the first receiver further performs the second-type channel monitoring; wherein the antenna port transmitting the first radio signal is not associated with any of the M2 second-type radio signals.

14. The method according to claim 11, wherein a probability of transmitting the first radio signal in the first time-domain resources when the first-type channel monitoring is adopted is larger than a probability of transmitting the first radio signal in the first time-domain resources when the second-type channel monitoring is adopted.

15. The base station according to claim 11, wherein a transmission power of one of the M2 second-type radio signals is related to one of the M1 first-type reference signals.

16. The base station according to claim 11, wherein a spatial domain transmission filter used for a transmission of one of the M2 second-type radio signals is related to one of the M1 first-type reference signals.

17. The base station according to claim 11, wherein the first transmitter further transmits first information; wherein the first information is used for determining Q time windows, with time-domain resources occupied by the M2 second-type radio signals belonging to the Q time windows; and the Q is a positive integer.

18. The base station according to claim 11, wherein the first transmitter further transmits a first signaling; wherein the first signaling indicates frequency-domain resources occupied by the M2 second-type radio signals.

19. The base station according to claim 11, wherein the first transmitter further transmits N1 first-type reference signals and the first receiver further receives first uplink information; wherein measurements targeting the N1 first-type reference signals are used for generating the first uplink information; and the first uplink information is used for determining the M1 first-type reference signals; and the N1 is a positive integer.

20. The base station according to claim 11, wherein the first transmitter further transmits N2 first-type reference signals and the first receiver further receives second uplink information; wherein measurements targeting the N2 first-type reference signals are used for generating the second uplink information; and the second uplink information is used for determining a first reference signal, with the antenna port transmitting the first radio signal being associated with the first reference signal; and the N2 is a positive integer.

* * * * *